(12) United States Patent
Umebayashi

(10) Patent No.: US 9,211,725 B2
(45) Date of Patent: Dec. 15, 2015

(54) INKJET RECORDING METHOD AND PRINTED MATERIAL

(71) Applicant: FUJIFILM CORPORATION, Tokyo (JP)

(72) Inventor: Tsutomu Umebayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 193 days.

(21) Appl. No.: 13/975,160

(22) Filed: Aug. 23, 2013

(65) Prior Publication Data

US 2013/0335495 A1 Dec. 19, 2013

Related U.S. Application Data

(63) Continuation of application No. PCT/JP2012/054193, filed on Feb. 22, 2012.

(30) Foreign Application Priority Data

Feb. 28, 2011 (JP) .................. 2011-043159
Mar. 31, 2011 (JP) .................. 2011-077800

(51) Int. Cl.
| | | |
|---|---|---|
| B41J 11/00 | (2006.01) |
| B41M 5/00 | (2006.01) |
| B41M 7/00 | (2006.01) |
| C09D 11/101 | (2014.01) |
| C09D 11/322 | (2014.01) |
| C09D 11/40 | (2014.01) |

(52) U.S. Cl.
CPC ............ *B41J 11/0015* (2013.01); *B41J 11/002* (2013.01); *B41M 5/0023* (2013.01);
(Continued)

(58) Field of Classification Search
CPC .... B41J 2/2107; B41J 2/2114; B41J 11/0015; B41J 11/002; C09D 11/322; C09D 11/326; C09D 11/36; C09D 11/40; C09D 11/54; C09D 11/101; B41M 7/0081

USPC ............... 347/9, 21, 51, 95, 96, 98, 100, 102; 106/31.13, 31.6

See application file for complete search history.

(56) References Cited

U.S. PATENT DOCUMENTS 7,891,799 B2 * 2/2011 Edwards et al. ............... 347/100
8,814,338 B2 * 8/2014 Komatsu et al. ............... 347/100
(Continued)

FOREIGN PATENT DOCUMENTS

| JP | 2008-000976 A | 1/2008 |
| JP | 2008-239951 A | 10/2008 |

(Continued)

OTHER PUBLICATIONS

International Search Report; PCT/JP2012/054193; May 22, 2012.

*Primary Examiner* — Matthew Luu
*Assistant Examiner* — Rut Patel
(74) *Attorney, Agent, or Firm* — Studebaker & Brackett PC

(57) ABSTRACT

An inkjet recording method includes in sequence an application step of applying a transparent ink or an effect pigment ink onto a recording medium, an image formation step of carrying out image formation by discharging an effect pigment ink or a transparent ink onto the recording medium, and a step of curing the transparent ink and the effect pigment ink above the recording medium, the method including or not including, between the application step and the image formation step, a step of curing the transparent ink or the effect pigment ink, and when it does the transparent ink or the effect pigment being cured at a percentage cure of no greater than 85%, the effect pigment ink including an effect pigment, a polymerization initiator, and a polymerizable compound, and the transparent ink including a polymerization initiator and a polymerizable compound but including substantially no pigment.

12 Claims, 5 Drawing Sheets

(52) U.S. Cl.
CPC ........... *B41M5/0029* (2013.01); *B41M 7/0081* (2013.01); *C09D 11/101* (2013.01); *C09D 11/322* (2013.01); *C09D 11/40* (2013.01)

(56) References Cited

U.S. PATENT DOCUMENTS

| | | | |
|---|---|---|---|
| 2007/0206045 A1* | 9/2007 | Umebayashi et al. | 347/21 |
| 2008/0180503 A1* | 7/2008 | Umebayashi | 347/102 |
| 2008/0238998 A1* | 10/2008 | Nakazawa et al. | 347/42 |
| 2008/0239045 A1* | 10/2008 | Umebayashi et al. | 347/102 |
| 2008/0250970 A1* | 10/2008 | Oyanagi et al. | 106/31.65 |
| 2010/0026751 A1* | 2/2010 | Oyanagi | 347/16 |
| 2012/0040147 A1* | 2/2012 | Komatsu et al. | 428/195.1 |

FOREIGN PATENT DOCUMENTS

| | | |
|---|---|---|
| JP | 2010-030139 A | 2/2010 |
| JP | 2010-138298 A | 6/2010 |
| JP | 2010-214804 A | 9/2010 |

\* cited by examiner

INKJET RECORDING METHOD AND PRINTED MATERIAL

BACKGROUND OF THE INVENTION

1. Field of the Invention

The present invention relates to an inkjet recording method and a printed material.

2. Description of the Related Art

Inkjet systems, in which an ink composition is discharged as droplets from an ink discharge orifice, are employed in many printers for reasons such as small size, low cost, and an ability to form an image without contacting a recording medium. Among these inkjet systems, a piezo inkjet system, in which an ink composition is discharged by utilizing deformation of a piezoelectric element, and a thermal inkjet system, in which droplets of an ink composition are discharged by utilizing the phenomenon of boiling of the ink by means of thermal energy, are characterized by their high resolution and high speed printing properties.

In recent years, inkjet printers have not been limited only to photographic printing and document printing for home use or office use, and the development of commercial printing equipment and industrial printing equipment employing inkjet printers has been carried out. In particular, the demand for wide format inkjet printers suitable for printing of large-size advertisement posters that are affixed to shop windows, station pathways and, furthermore, walls of buildings has been rapidly increasing.

Compared with conventional inkjet inks for domestic use or office use, there is a strong requirement for inks used in wide format inkjet printers to have adhesion to a non-permeable recording medium such as a plastic and to be resistant to the occurrence of problems such as cracking or coming-off of a printed material during processing such as bending or cutting out. Furthermore, printed materials might be placed outdoors, and the pigments used are therefore required to have excellent weatherability. Moreover, compared with conventional small-size inkjet printers widely used in photographic printing or document printing, wide format inkjet printers are often used for advertisements or displays and are required to have wide color reproduction and distinctive color properties. For example, inkjet printers that can make metallic or pearlescent printing possible have been attracting attention.

On the other hand, a technique for imparting surface gloss to an ink has been proposed. Patent Document 1 discloses an ink set comprising a metallic ink composition comprising a metal pigment, and at least one type of photocuring type ink composition selected from the group consisting of a chromatic color ink composition, a black ink composition, and a white ink composition. Furthermore, Patent Document 2 discloses a liquid-spraying recording method comprising forming dots by spraying onto a medium a liquid that cures when irradiated with light and comprises a metal pigment, applying an electric field to the dots, and irradiating with light the dots that have been subjected to the electric field.

(Patent Document 1) JP-A-2008-239951 (JP-A denotes a Japanese unexamined patent application publication)
(Patent Document 2) JP-A-2010-214804

It is an object of the present invention to provide an inkjet recording method that can give an image having an excellent metallic appearance (glitter) and excellent abrasion properties. Furthermore, it is another object of the present invention to provide a printed material obtained by the method.

Means for Solving the Problems

The objects of the present invention have been attained by means described in <1>, <18>, <19>, and <37>. They are described below together with <2> to <17> and <20> to <36>, which are preferred embodiments.

<1> An inkjet recording method comprising in sequence a transparent ink application step of applying a transparent ink onto a recording medium, an image formation step of carrying out image formation by discharging an effect pigment ink onto the recording medium, and a curing step of curing the transparent ink and the effect pigment ink above the recording medium, the method comprising or not comprising, between the transparent ink application step and the image formation step, a step of curing the transparent ink, and when it does the transparent ink being cured at a percentage cure of no greater than 85%, the effect pigment ink comprising an effect pigment, a polymerization initiator, and a polymerizable compound, and the transparent ink comprising a polymerization initiator and a polymerizable compound but comprising substantially no pigment, <2> the inkjet recording method according to <1>, wherein the method comprises or does not comprise, between the transparent ink application step and the image formation step, a step of curing the transparent ink, and when it does the transparent ink being cured at a percentage cure of no greater than 60%, <3> the inkjet recording method according to <1> or <2>, wherein in the image formation step the effect pigment ink is discharged so as to overlap the transparent ink that has been applied onto the recording medium, <4> the inkjet recording method according to any one of <1> to <3>, wherein in the image formation step the effect pigment ink is discharged onto a region, above the recording medium, to which the transparent ink has been applied, <5> the inkjet recording method according to any one of <1> to <4>, wherein the effect pigment comprises plate-shaped particles, the shape of the effect pigment satisfying relationship (1) and relationship (2) below $$0.5\ \mu m \leq R_{50} \leq 5\ \mu m \tag{1}$$

$$R_{50}/d > 5 \tag{2}$$

wherein in relationship (1) and relationship (2), $R_{50}$ is the 50% average particle size as an equivalent circle diameter obtained from the area of the plane of the particles, and d is the plate thickness, <6> the inkjet recording method according to any one of <1> to <5>, wherein the effect pigment is a metal pigment or a pearl pigment, <7> the inkjet recording method according to any one of <1> to <6>, wherein the effect pigment is of plate-shaped particles formed from multiple thin layers, <8> the inkjet recording method according to any one of <1> to <7>, wherein the effect pigment comprises aluminum or an aluminum alloy as a material, <9> the inkjet recording method according to any one of <1> to <8>, wherein relationship (3) below is satisfied $$-10\ mN/m \leq \gamma k - \gamma s \leq 5\ mN/m \tag{3}$$

where the surface tension of the effect pigment ink is γk and the surface tension of the transparent ink is γs, <10> the inkjet recording method according to any one of <1> to <9>, wherein relationship (4) below is satisfied $$30\ mN/m \leq \gamma k < \gamma s \leq 40\ mN/m \tag{4}$$

where the surface tension of the effect pigment ink is γk and the surface tension of the transparent ink is γs, <11> the inkjet recording method according to any one of <1> to <10>, wherein the effect pigment ink comprises a polymerizable compound selected from group 1 below in an amount of at least 40 wt % of the entire polymerizable compounds (Group 1-1)

octyl acrylate, decyl acrylate, lauryl acrylate, stearyl acrylate, isobornyl acrylate, isophoryl acrylate, 2-(2-ethoxyethoxy)ethyl acrylate, 1,6-hexanediol diacrylate, 3-methyl-1,5-pentanediol diacrylate, dipropylene glycol diacrylate, and propylene oxide-modified trimethylolpropane triacrylate, <12> the inkjet recording method according to any one of <1> to <11>, wherein the transparent ink comprises a polymerizable compound selected from group 2 below in an amount of at least 60 wt % of the entire polymerizable compounds (Group 1-2)

N-vinylcaprolactam, N-vinylformamide, N-vinylacetamide, N-methyl-N-vinylacetamide, tetrahydrofurfuryl acrylate, cyclic trimethylolpropane formal acrylate, 2-phenoxyethyl acrylate, triethylene glycol diacrylate, tetraethylene glycol diacrylate, trimethylolpropane triacrylate, and ethylene oxide-modified trimethylolpropane triacrylate.

<13> the inkjet recording method according to any one of <1> to <11>, wherein the transparent ink comprises a polymerizable compound selected from group 3 below in an amount of at least 60 wt % of the entire polymerizable compounds (Group 1-3)

N-vinylcaprolactam and 2-phenoxyethyl acrylate,

<14> the inkjet recording method according to any one of <1> to <13>, wherein the effect pigment ink further comprises a surfactant, <15> the inkjet recording method according to <14>, wherein the surfactant is a nonionic surfactant, <16> the inkjet recording method according to <14> or <15>, wherein the surfactant is a polymer comprising a poly(meth)acrylate skeleton, <17> the inkjet recording method according to any one of <1> to <16>, wherein the transparent ink is provided as a layer beneath the effect pigment ink and has a function of maintaining a higher concentration state of the effect pigment than the initial state of the effect pigment ink due to diffusion of part of the polymerizable compound in the effect pigment ink into the transparent ink, <18> a printed material obtained by the inkjet recording method according to any one of <1> to <17>, <19> an inkjet recording method comprising in sequence an image formation step of carrying out image formation by discharging an effect pigment ink onto a recording medium, a transparent ink application step of applying a transparent ink onto the recording medium, and a curing step of curing the effect pigment ink and the transparent ink above the recording medium, the method comprising or not comprising, between the image formation step and the transparent ink application step, a step of curing the effect pigment ink, and when it does the effect pigment ink being cured at a percentage cure of no greater than 85%, the transparent ink comprising a polymerization initiator and a polymerizable compound but comprising substantially no pigment, and the effect pigment ink comprising an effect pigment, a polymerization initiator, and a polymerizable compound, <20> the inkjet recording method according to <19>, wherein the method comprises or does not comprise, between the image formation step and the transparent ink application step, a step of curing the effect pigment ink, and when it does the effect pigment ink being cured at a percentage cure of no greater than 60%, <21> the inkjet recording method according to <19> or <20>, wherein in the transparent ink application step the transparent ink is applied so as to overlap the effect pigment ink that has been applied onto the recording medium, <22> the inkjet recording method according to any one of <19> to <21>, wherein in the transparent ink application step the transparent ink is applied so as to cover a region, above the recording medium, onto which the effect pigment ink has been applied, <23> the inkjet recording method according to any one of <19> to <22>, wherein the effect pigment is of plate-shaped particles, the shape of the effect pigment satisfying relationship (1) and relationship (2) below $$0.5 \text{ μm} \leq R_{50} \leq 5 \text{ μm} \quad (1)$$

$$R_{50}/d > 5 \quad (2)$$

wherein in relationship (1) and relationship (2), $R_{50}$ is the 50% average particle size as an equivalent circle diameter obtained from the area of the plane of the particles, and d is the plate thickness, <24> the inkjet recording method according to any one of <19> to <23>, wherein the effect pigment is a metal pigment or a pearl pigment, <25> the inkjet recording method according to any one of <19> to <24>, wherein the effect pigment is of plate-shaped particles formed from multiple thin layers, <26> the inkjet recording method according to any one of <19> to <25>, wherein the effect pigment comprises aluminum or an aluminum alloy as a material, <27> the inkjet recording method according to any one of <19> to <26>, wherein relationship (3) below is satisfied $$-10 \text{ mN/m} \leq \gamma s - \gamma k \leq 5 \text{ mN/m} \quad (3)$$

where the surface tension of the effect pigment ink is γk and the surface tension of the transparent ink is γs, <28> the inkjet recording method according to any one of <19> to <27>, wherein relationship (4) below is satisfied $$30 \text{ mN/m} \leq \gamma s < \gamma k \leq 40 \text{ mN/m} \quad (4)$$

where the surface tension of the effect pigment ink is γk and the surface tension of the transparent ink is γs, <29> the inkjet recording method according to any one of <19> to <28>, wherein the effect pigment ink comprises a polymerizable compound selected from group 1 below in an amount of at least 40 wt % of the entire polymerizable compounds (Group 2-1)

N-vinylcaprolactam, N-vinylformamide, N-vinylacetamide, N-methyl-N-vinylacetamide, tetrahydrofurfuryl acrylate, cyclic trimethylolpropane formal acrylate, 2-phenoxyethyl acrylate, triethylene glycol diacrylate, tetraethylene glycol diacrylate, trimethylolpropane triacrylate, and ethylene oxide-modified trimethylolpropane triacrylate, <30> the inkjet recording method according to any one of <19> to <29>, wherein the effect pigment ink comprises a polymerizable compound selected from group 2 below in an amount of at least 45 wt % of the entire polymerizable compounds (Group 2-2)

N-vinylcaprolactam and 2-phenoxyethyl acrylate,

<31> the inkjet recording method according to any one of <19> to <30>, wherein the transparent ink comprises a polymerizable compound selected from group 3 below in an amount of at least 60 wt % of the entire polymerizable compounds (Group 2-3)

octyl acrylate, decyl acrylate, lauryl acrylate, stearyl acrylate, isobornyl acrylate, isophoryl acrylate, 2-(2-ethoxyethoxy)ethyl acrylate, 1,6-hexanediol diacrylate, 3-methyl-1,5-pentanediol diacrylate, dipropylene glycol diacrylate, and propylene oxide-modified trimethylolpropane triacrylate, <32> the inkjet recording method according to any one of <19> to <31>, wherein the transparent ink comprises a polymerizable compound selected from the group consisting of group 4 below in an amount at least 60 wt % of the entire polymerizable compound (Group 2-4)

isobornyl acrylate, isophoryl acrylate, and 2-(2-ethoxyethoxy)ethyl acrylate,

<33> the inkjet recording method according to any one of <19> to <32>, wherein the transparent ink further comprises a surfactant, <34> the inkjet recording method according to <33>, wherein the surfactant is a nonionic surfactant, <35> the inkjet recording method according to <33> or <34>, wherein the surfactant is a polymer comprising a poly(meth)acrylate skeleton, <36> the inkjet recording method according to any one of <19> to <35>, wherein the transparent ink is provided as a layer above the effect pigment ink and has a function of maintaining a higher concentration state of the effect pigment than the initial state of the effect pigment ink due to diffusion of part of the polymerizable compound in the effect pigment ink into the transparent ink, and <37> a printed material obtained by the inkjet recording method according to any one of <19> to <36>.

EXPLANATION OF REFERENCE NUMERALS AND SYMBOLS

Figure 1:
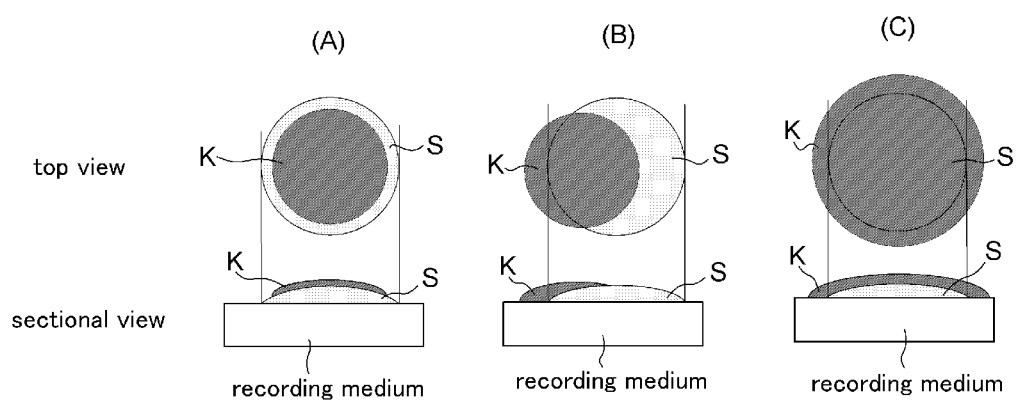
FIG. 1 A schematic diagram of a top view and a sectional view when an effect pigment ink is discharged so as to overlap a transparent ink or when a transparent ink is discharged so as to overlap an effect pigment ink.

1: shuttle scanning type inkjet recording printer, 2: inkjet recording head unit, 3: maintenance section, 4: power section, 5: fixed shaft, 6: control section, 7: recording medium suction stage, 8: ink tank, 9: recording medium, 10: recording medium transport roller, 11: recording medium wind-up roller, 21 to 27: head set, 28, 29: UV curing type lamp, 30: disk filter, 31: transparent ink roll coater, 32, 34, 36, 38: light source, 33, 35, 37, 39, 40: head unit, 41: metal halide lamp, 42: feeder, 43: rewinder, 44: recording medium, 50: ink layer, 51: metallic ink image, 52: cyan ink image, 53: magenta ink image, 54: yellow ink image, 55: black ink image

MODES FOR CARRYING OUT THE INVENTION

The inkjet recording method of the present invention comprises in sequence a transparent ink application step of applying a transparent ink onto a recording medium, an image formation step of carrying out image formation by discharging an effect pigment ink onto the recording medium, and a curing step of curing the transparent ink and the effect pigment ink above the recording medium, or comprises in sequence an image formation step of carrying out image formation by discharging an effect pigment ink onto a recording medium, a transparent ink application step of applying a transparent ink onto the recording medium, and a curing step of curing the effect pigment ink and the transparent ink above the recording medium, the method comprising or not comprising, between the transparent ink application step and the image formation step, a step of curing the transparent ink, and when it does the transparent ink being cured at a percentage cure of no greater than 85%, the effect pigment ink comprising an effect pigment, a polymerization initiator, and a polymerizable compound, and the transparent ink comprising a polymerization initiator and a polymerizable compound but comprising substantially no pigment.

The inkjet recording method of a first embodiment of the present invention comprises in sequence a transparent ink application step of applying a transparent ink onto a recording medium, an image formation step of carrying out image formation by discharging an effect pigment ink onto the recording medium, and a curing step of curing the transparent ink and the effect pigment ink above the recording medium, the method comprising or not comprising, between the transparent ink application step and the image formation step, a step of curing the transparent ink, and when it does the transparent ink being cured at a percentage cure of no greater than 85%, the effect pigment ink comprising an effect pigment, a polymerization initiator, and a polymerizable compound, and the transparent ink comprising a polymerization initiator and a polymerizable compound but comprising substantially no pigment.

The inkjet recording method of a second embodiment of the present invention comprises in sequence an image formation step of carrying out image formation by discharging an effect pigment ink onto a recording medium, a transparent ink application step of applying a transparent ink onto the recording medium, and a curing step of curing the effect pigment ink and the transparent ink above the recording medium, the method comprising or not comprising, between the image formation step and the transparent ink application step, a step of curing the effect pigment ink, and when it does the effect pigment ink being cured at a percentage cure of no greater than 85%, the transparent ink comprising a polymerization initiator and a polymerizable compound but comprising substantially no pigment, and the effect pigment ink comprising an effect pigment, a polymerization initiator, and a polymerizable compound.

In the present invention, the notation 'A to B' (here, A<B), which expresses a numerical range, means at least A but no greater than B, and the notation 'X to Y' (here, X>Y) means no greater than X but at least Y. That is, it means a numerical range that includes the end points.

Furthermore, in the present invention, reference simply to an 'ink' means a transparent ink, an effect pigment ink and, as necessary, a colored ink.

1. Inkjet Recording Method

The inkjet recording method of the first embodiment of the present invention comprises in sequence (1) a transparent ink application step of applying a transparent ink onto a recording medium, (2) an image formation step of carrying out image formation by discharging an effect pigment ink onto the recording medium, and (3) a curing step of curing the transparent ink and the effect pigment ink above the recording medium. In addition, the steps (1) to (3) may be repeated a plurality of times.

The inkjet recording method of the second embodiment of the present invention comprises in sequence (1') an image formation step of carrying out image formation by discharging an effect pigment ink, (2') a transparent ink application step of applying a transparent ink onto a recording medium, and (3') a curing step of curing the effect pigment ink and the transparent ink above the recording medium. In addition, the steps (1') to (3') may be repeated a plurality of times.

When a conventional solvent-based ink comprising an effect pigment is used, although a metallic appearance or a pearl appearance (glossiness) is obtained, it is not satisfactory in terms of abrasion resistance. On the other hand, with a conventional UV effect type ink composition, although abrasion resistance can be obtained, a metallic appearance or a pearl appearance (glossiness) is not satisfactory.

Although the mechanism of action is not clear, it has been found that an image having an excellent metallic appearance or pearl appearance (glossiness) and abrasion resistance can be obtained as a result of alignment of an effect pigment in an effect pigment ink being enhanced by carrying out image formation by discharging an effect pigment ink onto a recording medium to which a transparent ink has been applied or by applying a transparent ink after carrying out image formation by discharging an effect pigment ink.

It is surmised as a mechanism of action that, due to a transparent ink layer provided as a lower layer or an upper layer for an effect pigment ink, some of the polymerizable compound in the effect pigment ink diffuses into the transparent ink, a state in which the concentration of the effect pigment is higher than the initial state of the effect pigment ink can be maintained, a state in which the effect pigment is aligned is improved, and good glossiness can be achieved.

In the first embodiment of the present invention, the effect pigment ink is preferably discharged so as to overlap the transparent ink that has been applied onto the recording medium.

In the second embodiment of the present invention, the transparent ink is preferably applied so as to overlap the effect pigment ink that has been discharged onto the recording medium.

FIG. 1 shows schematic drawings of a top view and a sectional view when an effect pigment ink is discharged so as to overlap a transparent ink or when the transparent ink is discharged so as to overlap an effect pigment ink.

In the first embodiment of the present invention, in FIG. 1 (A), an effect pigment ink droplet K is completely surrounded by a transparent ink droplet S, and the effect pigment ink droplet K is applied completely above the transparent ink droplet S.

On the other hand, in the first embodiment of the present invention, in FIGS. 1 (B) and (C), there is an area where the effect pigment ink droplet K and the transparent ink droplet S overlap one another; part of the effect pigment ink droplet K is not applied onto the transparent ink droplet S but is applied directly onto the recording medium.

Since an area where the effect pigment ink droplet K and the transparent ink droplet S overlap one another is excellent for improving the optical effect (surface gloss), as shown in FIG. 1 (A), it is preferable to apply the transparent ink and the effect pigment ink onto the recording medium so that the effect pigment ink droplet K is completely surrounded by the transparent ink droplet S. That is, it is preferable for the effect pigment ink to be discharged onto a region, of the recording medium, to which the transparent ink has been applied.

In the first embodiment of the present invention, in order to achieve a way to overlap droplets as shown in FIG. 1 (A), a method in which the amounts discharged of droplets of the transparent ink and the effect pigment ink are appropriately adjusted or the numbers of droplets discharged are changed, etc. is selected. Furthermore, it is also effective to carry out adjustment such that the position of the center of a discharged droplet of the transparent ink above the recording medium coincides with the position of the center of a discharged droplet of the effect pigment ink above the recording medium.

Furthermore, a method in which a coating layer of the transparent ink is provided and the effect pigment ink is discharged thereonto is also preferable.

In the second embodiment of the present invention, in FIG. 1 (A) the transparent ink droplet S completely covers the effect pigment ink droplet K, and the effect pigment ink droplet K is present completely in the interior of the transparent ink droplet S.

On the other hand, in the second embodiment of the present invention, in FIGS. 1 (B) and (C), although there is an area where the effect pigment ink droplet K and the transparent ink droplet S overlap one another, part of the effect pigment ink droplet K is not covered by the transparent ink droplet S, and the part of the effect pigment ink is exposed.

Since the area where the effect pigment ink droplet K and the transparent ink droplet S overlap one another is excellent for improving the optical effect (surface gloss), as shown in FIG. 1 (A) it is preferable to apply the effect pigment ink and the transparent ink onto the recording medium such that the effect pigment ink droplet K is completely surrounded by the transparent ink droplet S. That is, it is preferable for the transparent ink to be applied so as to cover a region, of the recording medium, to which the effect pigment ink has been applied.

In the second embodiment of the present invention, in order to achieve a way to overlap droplets as shown in FIG. 1 (A), a method in which the amounts discharged of droplets of the effect pigment ink and the transparent ink are appropriately adjusted or the numbers of droplets discharged is changed, etc. is selected. Furthermore, it is also effective to carry out adjustment such that the position of the center of a discharged droplet of the effect pigment ink above the recording medium coincides with the position of the center of a discharged droplet of the transparent ink above the recording medium.

Furthermore, a method in which a coating layer of the transparent ink is provided after the effect pigment ink has been discharged is also preferable.

In the present invention, it is necessary for the effect pigment ink and the transparent ink to overlap in a state in which they both have flowability with respect to each other. Overlapping in a state in which they have flowability enables an image having excellent optical effects such as a metallic appearance and a pearl appearance to be obtained.

Therefore, it is preferable for the first embodiment of the present invention not to comprise a step of curing the transparent ink (e.g. a step of irradiating with UV, etc.) between the transparent ink application step and the image formation step. Furthermore, even when it comprises a step of curing the transparent ink, the percentage cure of the transparent ink is no greater than 85%, preferably no greater than 60%, more preferably no greater than 50%, and yet more preferably no greater than 30%. By lowering the percentage cure and making a less cured state, it becomes possible to maintain the flowability of the transparent ink and reduce the time it takes for the effect pigment to be aligned, thus improving the printing speed. Furthermore, an image that is obtained has an excellent optical effect, which is preferable.

The percentage cure in the first embodiment of the present invention may be determined as follows by applying the transparent ink onto a non-permeable recording medium and carrying out a transfer test immediately before the image formation step.

> Percentage cure=weight remaining on recording medium immediately before image formation step/weight on recording medium immediately after transparent ink application step×100

The transfer test is carried out by pressing plain paper against the transparent ink above the recording medium for 5 to 10 sec while applying a force of 5 kg per A4 size, and peeling off the plain paper.

Furthermore, it is preferable for the second embodiment of the present invention not to comprise a step of curing the effect pigment ink (e.g. a step of irradiating with UV, etc.) between the image formation step and the transparent ink application step. Moreover, even when it comprises a step of curing the effect pigment ink, the percentage cure of the effect pigment ink is no greater than 85%, preferably no greater than 60%, more preferably no greater than 50%, and yet more preferably no greater than 30%. By lowering the percentage cure and making a less cured state, it becomes possible to maintain the flowability of the effect pigment ink and reduce the time it takes for the effect pigment to be aligned, thus improving the printing speed. Furthermore, an image that is obtained has an excellent optical effect, which is preferable.

The percentage cure in the second embodiment of the present invention may be determined as follows by applying the effect pigment ink onto a non-permeable recording medium and carrying out a transfer test immediately before the transparent ink application step.

> Percentage cure=weight remaining on recording medium immediately before transparent ink application step/weight on recording medium immediately after image formation step×100

The transfer test is carried out by pressing plain paper against the effect pigment ink above the recording medium for 5 to 10 sec while applying a force of 5 kg per A4 size, and peeling off the plain paper.

Each step is explained below.

(1) Transparent Ink Application Step

In the transparent ink application step of the first embodiment of the present invention, it is preferable to apply the transparent ink to the same region as an image formed by discharging droplets of the effect pigment ink, or a region that is wider than the image.

The amount of transparent ink applied (ratio by weight per unit area) is preferably in the range of at least 0.05 but no greater than 5 when the maximum amount of effect pigment ink applied is defined as 1, more preferably in the range of at least 0.07 but no greater than 4, and particularly preferably in the range of at least 0.1 but no greater than 3.

In the inkjet recording method of the present invention, as means for applying the transparent ink on top of the recording medium, a coating machine, an inkjet nozzle, etc. may be used.

The coating machine is not particularly limited and may be appropriately selected from known coating machines according to the intended purpose, etc., and examples thereof include an air doctor coater, a blade coater, a rod coater, a knife coater, a squeegee coater, an immersion coater, a reverse roll coater, a transfer roll coater, a gravure coater, a kiss roll coater, a cast coater, a spray coater, a curtain coater, and an extrusion coater. Details may be referred to in 'Kotingu Kogaku (Coating Engineering)' by Yuji Harasaki.

Among them, in terms of equipment cost, application of the transparent ink on top of the recording medium is preferably carried out by coating using a relatively inexpensive bar coater or spin coater or by applying by an inkjet method.

(2) Image Formation Step

In the first embodiment of the present invention, it is preferable for the effect pigment ink to be fired as droplets with a droplet size of at least 0.1 pL (picoliter; the same applies below) but no greater than 100 pL (preferably via an inkjet nozzle). A droplet size in this range is effective in terms of the capability of drawing an image having high sharpness at high density and obtaining superior optical characteristics. It is more preferably at least 0.5 pL but no greater than 50 pL.

Furthermore, from the viewpoint of surface gloss, curability, smoothness of the image surface, etc., the maximum liquid amount of effect pigment ink that is applied onto a recording medium is preferably at least 0.01 g/cm$^2$ but no greater than 0.200 g/cm$^2$, more preferably at least 0.02 g/cm$^2$ but no greater than 0.150 g/cm$^2$, and particularly preferably at least 0.03 g/cm$^2$ but no greater than 0.100 g/cm$^2$.

Here, 'onto a recording medium' means an area above a recording medium and it does not necessarily mean contact with the recording medium.

After the transparent ink is applied, it is preferable for the fired droplet interval before an effect pigment ink droplet is fired to be in the range of at least 5 μsec but no greater than 10 sec. A fired droplet interval in this range is effective since the effect of the present invention can be exhibited prominently. The fired droplet interval for the effect pigment ink droplets is more preferably at least 10 μsec but no greater than 5 sec, and particularly preferably at least 20 μsec but no greater than 5 sec.

The inkjet recording device used in the image formation step is not particularly limited, and any known inkjet recording device that can achieve an intended resolution may be used. That is, any known inkjet recording device, such as a commercial product, may be selected and used in order to discharge the effect pigment ink onto the recording medium in the image formation step of the inkjet recording method of the present invention.

The inkjet recording device that can be used in the present invention is equipped with, for example, an ink supply system, a temperature sensor, and an actinic radiation source.

The ink supply system comprises, for example, a main tank containing the ink, a supply pipe, an ink composition supply tank immediately before an inkjet head, a filter, and a piezo system inkjet head. The piezo system inkjet head may be driven so as to discharge a multisize dot of preferably 3 to 42 pL, and more preferably 8 to 30 pL, at a resolution of preferably 300×300 to 4,000×4,000 dpi, and more preferably 400× 400 to 1,600×1,600 dpi. Here, dpi referred to in the present invention means the number of dots per 2.54 cm.

In the present invention, since it is desirable for the ink to be discharged at a constant temperature, the inkjet recording device equipped with a temperature stabilizer for stabilizing the temperature of the ink composition is preferably used. Parts to be controlled to a constant temperature include all of the supply pipe system and the members from the ink tank (including an intermediate tank if it is provided) to the discharging face of the nozzle. A section from the ink supply tank to the inkjet head is thermally insulated and heated.

A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

The radiation curing type ink composition such as the ink used in the present invention generally has a viscosity that is higher than that of a water-based ink normally used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore preferable to maintain the ink composition discharge temperature as constant as possible. The control range for the temperature of the ink is preferably ±5° C. of a set temperature, more preferably ±2° C. of the set temperature, and yet more preferably ±1° C. of the set temperature.

As means for applying a colored ink, an inkjet head is preferably used. Preferred examples of the inkjet head include heads employing a charge control system in which an ink is discharged by utilizing an electrostatic attraction force, a drop-on-demand system (pressure pulse system) in which oscillatory pressure of a piezo element is utilized, an acoustic inkjet system in which an electrical signal is changed into an acoustic beam and applied to an ink, and the ink is discharged by utilizing radiation pressure, a thermal inkjet (Bubblejet (registered trademark)) in which a bubble is formed by heating an ink and the pressure thus generated is utilized, etc.

(1') Image Formation Step

In the second embodiment of the present invention, it is preferable for the effect pigment ink to be fired as droplets with a droplet size of at least 0.1 pL (picoliter; the same applies below) but no greater than 100 pL (preferably via an inkjet nozzle). A droplet size in this range is effective in terms of the capability of drawing an image having high sharpness at high density and obtaining superior optical characteristics. It is more preferably at least 0.5 pL but no greater than 50 pL.

Furthermore, from the viewpoint of surface gloss, curability, smoothness of the image surface, etc., the maximum liquid amount of effect pigment ink that is applied onto a recording medium is preferably at least 0.01 g/cm$^2$ but no greater than 0.200 g/cm$^2$, more preferably at least 0.02 g/cm$^2$ but no greater than 0.150 g/cm$^2$, and particularly preferably at least 0.03 g/cm$^2$ but no greater than 0.100 g/cm$^2$.

The inkjet recording device used in the image formation step is not particularly limited, and any known inkjet recording device that can achieve an intended resolution may be used. That is, any known inkjet recording device, such as a commercial product, may be selected and used in order to discharge the effect pigment ink onto the recording medium in the image formation step of the inkjet recording method of the present invention.

The inkjet recording device that can be used in the present invention is equipped with, for example, an ink supply system, a temperature sensor, and an actinic radiation source.

The ink supply system comprises, for example, a main tank containing the ink, a supply pipe, an ink composition supply tank immediately before an inkjet head, a filter, and a piezo system inkjet head. The piezo system inkjet head may be driven so as to discharge a multisize dot of preferably 3 to 42 pL, and more preferably 8 to 30 pL, at a resolution of preferably 300×300 to 4,000×4,000 dpi, and more preferably 400× 400 to 1,600×1,600 dpi. Here, dpi referred to in the present invention means the number of dots per 2.54 cm.

In the present invention, since it is desirable for the ink to be discharged at a constant temperature, the inkjet recording device equipped with a temperature stabilizer for stabilizing the temperature of the ink composition is preferably used. Parts to be controlled to a constant temperature include all of the supply pipe system and the members from the ink tank (including an intermediate tank if it is provided) to the discharging face of the nozzle. A section from the ink supply tank to the inkjet head is thermally insulated and heated.

A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

The radiation curing type ink composition such as the ink used in the present invention generally has a viscosity that is higher than that of a water-based ink normally used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore preferable to maintain the ink composition discharge temperature as constant as possible. The control range for the temperature of the ink is preferably ±5° C. of a set temperature, more preferably ±2° C. of the set temperature, and yet more preferably ±1° C. of the set temperature.

As means for applying an effect pigment ink, an inkjet head is preferably used. Preferred examples of the inkjet head include heads employing a charge control system in which an ink is discharged by utilizing an electrostatic attraction force, a drop-on-demand system (pressure pulse system) in which oscillatory pressure of a piezo element is utilized, an acoustic inkjet system in which an electrical signal is changed into an acoustic beam and applied to an ink, and the ink is discharged by utilizing radiation pressure, a thermal inkjet (Bubblejet (registered trademark)) in which a bubble is formed by heating an ink and the pressure thus generated is utilized, etc.

(2') Transparent Ink Application Step

In the transparent ink application step of the second embodiment of the present invention, it is preferable to apply the transparent ink to the same region as an image formed by discharging droplets of the effect pigment ink, or a region that is wider than the image.

The amount of transparent ink applied (ratio by weight per unit area) is preferably in the range of at least 0.05 but no greater than 5 when the maximum amount of effect pigment ink applied is defined as 1, more preferably in the range of at least 0.07 but no greater than 4, and particularly preferably in the range of at least 0.1 but no greater than 3.

Here, 'onto a recording medium' means an area above a recording medium and it does not necessarily mean contact with the recording medium.

After the effect pigment ink is applied, it is preferable for the fired droplet interval before a transparent ink droplet is fired to be in the range of at least 5 μsec but no greater than 10 sec. A fired droplet interval for a transparent ink droplet in this range is effective since the effect of the present invention can be exhibited prominently. The fired droplet interval for the transparent ink droplets is more preferably at least 10 μsec but no greater than 5 sec, and particularly preferably at least 20 μsec but no greater than 5 sec.

In the inkjet recording method of the present invention, as means for applying the transparent ink on top of the recording medium, a coating machine, an inkjet nozzle, etc. may be used.

The coating machine is not particularly limited and may be appropriately selected from known coating machines according to the intended purpose, etc., and examples thereof include an air doctor coater, a blade coater, a rod coater, a knife coater, a squeegee coater, an immersion coater, a reverse roll coater, a transfer roll coater, a gravure coater, a kiss roll coater, a cast coater, a spray coater, a curtain coater, and an extrusion coater. Details may be referred to in 'Kotingu Kogaku (Coating Engineering)' by Yuji Harasaki.

Among them, in terms of equipment cost, application of the transparent ink on top of the recording medium is preferably carried out by coating using a relatively inexpensive bar coater or spin coater or by applying by an inkjet method.

(3) Curing Step and (3') Curing Step

In the curing step, it is preferable to cure the transparent ink and the effect pigment ink above the recording medium by the application of actinic radiation or heat.

As described above, the first embodiment of the present invention may comprise a curing step after the transparent ink application step, but in order to maintain the flowability of the transparent ink it is preferable for it not to comprise a curing step after the transparent ink application step, and it is preferable for it to comprise a curing step of curing the transparent ink and the effect pigment ink all at once after the transparent ink application step and the image formation step.

Furthermore, as described above, the second embodiment of the present invention may also comprise a curing step after the image formation step, but in order to maintain the flowability of the effect pigment ink it is preferable for it not to comprise a curing step after the image formation step, and it is preferable for it to comprise a curing step of curing the effect pigment ink and the transparent ink all at once after the image formation step and the transparent ink application step.

With regard to curing means, a light source for emitting actinic radiation, a heater such as an electric heater or an oven, etc. may be selected according to the intended purpose.

As the actinic radiation, in addition to ultraviolet rays, visible light, a rays, γ rays, X rays, an electron beam, etc. may be used. Among them, an electron beam, ultraviolet rays, and visible light are preferable as the actinic radiation from the viewpoint of cost and safety, and ultraviolet rays are particularly preferable.

The amount of energy necessary for a curing reaction depends on the composition and, in particular, the type and content of a polymerization initiator, and it is preferably on the order of at least 100 mJ/cm$^2$ but no greater than 10,000 mJ/cm$^2$.

Preferred examples of equipment for emitting actinic radiation include a metal halide lamp, a mercury lamp, and an LED light source.

When a colored ink is used in addition to the transparent ink and the effect pigment ink, the colored ink may be applied onto the recording medium before the image formation step using the effect pigment ink, according to a desired image. Furthermore, in the first embodiment of the present invention, it may be applied after image formation using the effect pigment ink. Among these, the first embodiment of the present invention preferably comprises an image formation step using a colored ink after the image formation step using the effect pigment ink. In the second embodiment of the present invention, the colored ink may be applied onto the recording medium after the transparent ink application step. Among these, the second embodiment of the present invention preferably comprises an image formation step using a colored ink before the image formation step using the effect pigment ink or after the transparent ink application step. Among these, it is preferable to discharge a colored ink after the transparent ink application step.

The first embodiment of the present invention comprises, when a colored ink is discharged after the effect pigment ink, an image formation step using the colored ink after the transparent ink application step and the image formation step using the effect pigment ink. After the image formation step using the effect pigment ink, a curing step for the effect pigment ink is carried out, and following this an image formation step using a colored ink and a curing step for the colored ink may be carried out, or after image formation using a colored ink the effect pigment ink and the colored ink may be cured all at once. Furthermore, it is also preferable to carry out a curing step after the image formation step using the effect pigment ink such that the effect pigment ink is not completely cured and the percentage cure is 10% to 80%. Moreover, when a plurality of colored inks are used, curing may be carried out for each color, or curing may be carried out after all colors are discharged.

Furthermore, the second embodiment of the present invention comprises, when a colored ink is discharged after the transparent ink application step, an image formation step using a colored ink after the image formation step using the effect pigment ink and the transparent ink application step. After the transparent ink application step, a curing step for the effect pigment ink and the transparent ink may be carried out, and following this an image formation step using a colored ink and a curing step for the colored ink may be carried out, or after image formation using a colored ink the effect pigment ink, the transparent ink, and the colored ink may be cured all at once. It is also preferable to set the percentage cure of the transparent ink and the effect pigment ink such that it is 10% to 80%. Moreover, when a plurality of colored inks are used, curing may be carried out for each color, or curing may be carried out after all colors are discharged.

When a colored ink is used, it is preferable to use a plurality of colored inks, and for example a colored ink set comprising colored inks of the four colors of yellow, cyan, magenta, and black, or colored inks of five colors that further comprise a white ink may be used. The order in which colored inks are discharged is not particularly limited, but it is preferable to apply to a recording medium from a colored ink having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black.

In order to obtain a full color image, it is preferable to use four colored inks of yellow, cyan, magenta, and black, or five colored inks of yellow, cyan, magenta, black, and white. Furthermore, the present invention is not limited thereto, and eight colored inks of cyan, light cyan, magenta, light magenta, gray, black, white, and yellow may also be used.

In the present invention, the recording medium is not particularly limited, and known recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. Examples of a preferred support include a polyester film and an aluminum plate. In the present invention, as the recording medium, a non-absorbing recording medium may preferably be used.

2. Inkjet Recording Ink Set

An ink set used in the inkjet recording method of the present invention (also called the ink set of the present invention) is explained below. The ink set comprises at least the transparent ink and the effect pigment ink. The ink set may further comprise a colored ink, examples of the colored ink including inks of colors such as black, yellow, magenta, cyan, and white. Furthermore, the colored ink is not limited to the above colors, and may be a light color ink of light cyan, light magenta, etc.

(1) Transparent Ink

In the present invention, the transparent ink comprises a polymerization initiator and a polymerizable compound and comprises substantially no pigment.

Here, 'comprising substantially no pigment' does not exclude comprising a colorless transparent pigment or comprising a very minute amount that is not visible. As an allowable level thereof, it is preferably no greater than 1 wt % relative to the total weight of the transparent ink, and particularly preferably none is contained.

Furthermore, as described later, the transparent ink preferably comprises a sensitizer, and in particular it preferably comprises a sensitizer represented by Formula (I), which is described later.

Moreover, the transparent ink in the second embodiment of the present invention preferably comprises a surfactant.

(2) Effect Pigment Ink

In the present invention, the effect pigment ink comprises an effect pigment, a polymerization initiator, and a polymerizable compound. Furthermore, the effect pigment ink in the first embodiment of the present invention preferably comprises a surfactant, as described later.

(3) Colored Ink

In the inkjet recording method of the present invention, in addition to the transparent ink and the effect pigment ink, a colored ink may be used as necessary.

The colored ink comprises a colorant, a polymerizable compound, and a polymerizable compound. The colorant means a colorant other than an effect pigment.

(Relationship Between Surface Tensions of Transparent Ink and Effect Pigment Ink in First Embodiment of Present Invention)

In the first embodiment of the present invention, since when the surface tension of the transparent ink is much lower than the surface tension of the effect pigment ink, the optical effect is small, it is preferable to set the surface tension of the transparent ink at a higher level. When the surface tension of the transparent ink is lower than the surface tension of the effect pigment ink, the difference therebetween is preferably no greater than 5 mN/m, and it is more preferable that the surface tension of the transparent ink is higher than the surface tension of the effect pigment ink.

That is, when the surface tension at 25° C. of the effect pigment ink is γk, and the surface tension at 25° C. of the transparent ink is γs, it is preferable that γk−γs≤5 mN/m, and it is more preferable that γk−γs<0.

The lower limit of γk−γs is not particularly limited, but it is preferably −10 mN/m or above, more preferably −8 mN/m or above, and yet more preferably −5 mN/m or above.

The surface tension is a value measured by the Wilhelmy method using a normal surface tensiometer (e.g. a CBVP-Z surface tensiometer manufactured by Kyowa Interface Science Co., Ltd., etc.) at a liquid temperature of 25° C.

In the first embodiment of the present invention, the surface tension (γk) at 25° C. of the effect pigment ink is preferably 30 to 40 mN/m from the viewpoint of forming a uniform film above the transparent ink using the effect pigment ink, more preferably 30 to 38 mN/m, and yet more preferably 30 to 36 mN/m.

In the first embodiment of the present invention, the surface tension (γs) at 25° C. of the transparent ink is preferably 30 to 40 mN/m from the viewpoint of preventing cissing on the recording medium and appropriately maintaining the surface tension with respect to the effect pigment ink, more preferably 32 to 40 mN/m, and yet more preferably 32 to 38 mN/m.

It is preferable to carry out appropriate adjustment to obtain a desired surface tension by selection of the polymerizable compound used, addition of a surfactant, etc.

(Relationship Between Surface Tensions of Transparent Ink and Effect Pigment Ink in Second Embodiment of Present Invention)

In the second embodiment of the present invention, since when the surface tension of the effect pigment ink is much lower than the surface tension of the transparent ink, the optical effect is small, it is preferable to set the surface tension of the effect pigment ink at a higher level. When the surface tension of the effect pigment ink is lower than the surface tension of the transparent ink, the difference therebetween is preferably no greater than 5 mN/m, and it is more preferable that the surface tension of the effect pigment ink is higher than the surface tension of the transparent ink.

That is, when the surface tension at 25° C. of the transparent ink is γs, and the surface tension at 25° C. of the effect pigment ink is γk, it is preferable that γs−γk 5 mN/m, and it is more preferable that γs−γk<0.

The lower limit of γs−γk is not particularly limited, but it is preferably −10 mN/m or above, more preferably −8 mN/m or above, and yet more preferably −5 mN/m or above.

The surface tension is a value measured by the Wilhelmy method using a normal surface tensiometer (e.g. a CBVP-Z surface tensiometer manufactured by Kyowa Interface Science Co., Ltd., etc.) at a liquid temperature of 25° C.

In the second embodiment of the present invention, the surface tension (γs) at 25° C. of the transparent ink is preferably 30 to 40 mN/m from the viewpoint of forming a uniform film above the effect pigment ink using the transparent ink, more preferably 30 to 38 mN/m, and yet more preferably 30 to 36 mN/m.

In the second embodiment of the present invention, the surface tension (γk) at 25° C. of the effect pigment ink is preferably 30 to 40 mN/m from the viewpoint of preventing cissing on the recording medium and appropriately maintaining the surface tension with respect to the transparent ink, more preferably 32 to 40 mN/m, and yet more preferably 32 to 38 mN/m.

It is preferable to carry out appropriate adjustment to obtain a desired surface tension by selection of the polymerizable compound used, addition of a surfactant, etc.

(Physical Properties of Ink)

The inks of the present invention, in particular the effect pigment ink and the colored ink, preferably have a viscosity at 25° C. of no greater than 40 mPa·s while taking into consideration discharge properties; it is more preferably 5 to 40 mPa·s, and yet more preferably 7 to 30 mPa·s. Furthermore, the viscosity at the discharge temperature (preferably 25° C. to 80° C., more preferably 25° C. to 50° C.) is preferably 3 to 15 mPa·s, and more preferably 3 to 13 mPa·s. With regard to the inks of the present invention, the compositional ratio thereof is preferably adjusted so that the viscosity is in this range. It is preferable to set the viscosity at room temperature (25° C.) at a high level since it becomes possible to prevent the ink from penetrating into the recording medium and reduce uncured monomer even when a porous recording medium is used. Furthermore, it is preferable since it becomes possible to suppress spreading of the ink when an ink droplet has landed, and as a result the image quality can be improved.

The components of the transparent ink, the effect pigment ink, and the colored ink are explained below.

(Polymerizable Compound)

In the present invention, as a polymerizable compound contained in the inks (the transparent ink, the effect pigment ink, and the colored ink), a radically polymerizable compound is preferable.

In the first embodiment of the present invention, the reason why a radically polymerizable compound is suitably used in the transparent ink is that, when a step of curing a transparent ink is provided between (1) a transparent ink application step of applying a transparent ink onto a recording medium and (2) an image formation step of carrying out image formation by discharging an effect pigment ink onto the recording medium, due to inhibition of polymerization by oxygen, which is unique to radical polymerization, it is easy to maintain a state in which the flowability is sustained with a percentage cure of the transparent ink of no greater than 85%.

On the other hand, in the first embodiment of the present invention, the reason why a radically polymerizable compound is suitably used in the effect pigment ink is that, when a radically polymerizable compound is used, storage stability of the effect pigment ink is better than in the case of a cationically polymerizable compound, etc.

Furthermore, in the second embodiment of the present invention, the reason why a radically polymerizable compound is suitably used in the effect pigment ink is that, when a step of curing an effect pigment ink is provided between (1') an image formation step of discharging an effect pigment ink onto a recording medium and (2') a transparent ink application step of applying a transparent ink onto the recording medium, due to inhibition of polymerization by oxygen, which is unique to radical polymerization, it is easy to maintain a state in which the flowability is sustained with a percentage cure of the effect pigment ink of no greater than 85%.

On the other hand, in the second embodiment of the present invention, the reason why a radically polymerizable compound is suitably used in the transparent ink is that, when a radically polymerizable compound is used, the storage stability of the transparent ink is better than in the case of a cationically polymerizable compound, etc.

The radically polymerizable compound is not particularly limited as long as it is a compound that causes a radical polymerization reaction upon application of some form of energy and cures; any type of monomer, oligomer, or polymer may be used and, in particular, various type of known radically polymerizable monomers that are known as photoradically polymerizable monomers that undergo a polymerization reaction by an initiating species generated from a radical polymerization initiator, which is described later, may be used. Furthermore, the radically polymerizable compound may be a monofunctional polymerizable compound or a polyfunctional polymerizable compound.

Examples of the radically polymerizable compound include a (meth)acrylate, a (meth)acrylamide, an aromatic vinyl, and an N-vinyl compound. In the present specification, the notation '(meth)acrylate' may be used to mean either or both 'acrylate' and 'methacrylate', and the notation '(meth)acrylic' may be used to mean either or both 'acrylic' and 'methacrylic'.

The radically polymerizable compound in the present invention is preferably a (meth)acrylate in terms of curability and viscosity. In particular, in terms of viscosity, it is more preferably at least one type selected from a monofunctional (meth)acrylate and a difunctional (meth)acrylate.

Radically polymerizable compounds that can be used in the present invention are explained in detail below.

Examples of (meth)acrylates used in the present invention include those below.

Specific examples of the monofunctional (meth)acrylate include hexyl (meth)acrylate, 2-ethylhexyl (meth)acrylate, octyl (meth)acrylate, isoamyl (meth)acrylate, decyl (meth)acrylate, isodecyl (meth)acrylate, lauryl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, isophoryl (meth)acrylate (3,5,5-trimethylcyclohexyl (meth)acrylate), benzyl (meth)acrylate, 2-ethylhexyldiglycol (meth)acrylate, butoxymethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, an alkoxymethyl (meth)acrylate, an alkoxyethyl (meth)acrylate, 2-(2-methoxyethoxy)ethyl (meth)acrylate, 2-(2-ethoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, morpholino (meth)acrylate, tetrahydrofurfuryl (meth)acrylate, cyclic trimethylolpropane formal (meth)acrylate, hydroxyalkyl (meth)acrylate, 2-hydroxyethyl (meth)acrylate, 3-hydroxypropyl (meth)acrylate, tetrahydrofurfuryl (meth)acrylate, a hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, an oligoethylene oxide monoalkyl ether (meth)acrylate, a polyethylene oxide monoalkyl ether (meth)acrylate, dipropylene glycol (meth)acrylate, a polypropylene oxide monoalkyl ether (meth)acrylate, an oligopropylene oxide monoalkyl ether (meth)acrylate, 2-methacryloyloxyethylsuccinic acid, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, ethylene oxide(EO)-modified phenol (meth)acrylate, ethylene oxide-modified cresol (meth)acrylate, EO-modified nonylphenol (meth)acrylate, propylene oxide(PO)-modified nonylphenol (meth)acrylate, and EO-modified 2-ethylhexyl (meth)acrylate.

Specific examples of the difunctional (meth)acrylate include dipropylene glycol di(meth)acrylate, dimethyloldicyclopentane di(meth)acrylate, 1,9-nonanediol di(meth)acrylate, 1,6-hexanediol di(meth)acrylate, 1,10-decanediol di(meth)acrylate, neopentyl glycol di(meth)acrylate, 3-methyl-1,5-pentanediol di(meth)acrylate, 2,4-dimethyl-1,5-pentanediol di(meth)acrylate, butylethylpropanediol di(meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butylbutanediol di(meth)acrylate, neopentyl glycol hydroxypivalate di(meth)acrylate, EO-modified bisphenol A di(meth)acrylate, bisphenol F polyethoxy di(meth)acrylate, dipropylene glycol di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, etc.

Specific examples of the trifunctional (meth)acrylate include trimethylolpropane tri(meth)acrylate, trimethylolethane tri(meth)acrylate, an alkylene oxide-modified (e.g. ethylene oxide-modified, propylene oxide-modified) tri(meth)acrylate of trimethylolpropane, pentaerythritol tri(meth)acrylate, dipentaerythritol tri(meth)acrylate, trimethylolpropane tri((meth)acryloyloxypropyl)ether, an isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, sorbitol tri(meth)acrylate, propoxylated trimethylolpropane tri(meth)acrylate, and ethoxylated glycerol triacrylate, etc.

Specific examples of tetrafunctional (meth)acrylates include pentaerythritol tetra(meth)acrylate, sorbitol tetra(meth)acrylate, ditrimethylolpropane tetra(meth)acrylate, dipentaerythritol propionate tetra(meth)acrylate, ethoxylated pentaerythritol tetra(meth)acrylate, etc.

Specific examples of pentafunctional (meth)acrylates include sorbitol penta(meth)acrylate and dipentaerythritol penta(meth)acrylate.

Specific examples of hexafunctional (meth)acrylates include dipentaerythritol hexa(meth)acrylate, sorbitol hexa(meth)acrylate, an alkylene oxide-modified hexa(meth)acrylate of phosphazene, caprolactone-modified dipentaerythritol hexa(meth)acrylate, ethoxylated dipentaerythritol hexaacrylate, etc.

Examples of the (meth)acrylamide that can be used in the present invention include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, and (meth)acryloylmorpholine.

Specific examples of the aromatic vinyl compound that can be used in the present invention include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, 4-t-butoxy styrene, etc.

Specific examples of the N-vinyl compound include N-vinylformamide, N-vinylacetoamide, N-methyl-N-vinylacetoamide, N-methyl-N-vinylformamide, N-vinyl pyrrolidone, N-vinylcaprolactam, N-vinylvalerolactam, N-vinylimidazole, etc.

Furthermore, examples of the radically polymerizable monomer in the present invention include a vinyl ester (vinyl acetate, vinyl propionate, vinyl versatate, etc.), an allyl ester (allyl acetate, etc.), a halogen-containing monomer (vinylidene chloride, vinyl chloride, etc.), a vinyl ether (methyl vinyl ether, butyl vinyl ether, hexyl vinyl ether, methoxy vinyl ether, 2-ethylhexyl vinyl ether, methoxyethyl vinyl ether, cyclohexyl vinyl ether, chloroethyl vinyl ether, etc.), a vinyl cyanide ((meth)acrylonitrile, etc.), and an olefin (ethylene, propylene, etc.).

In addition to the above, a polymerizable oligomer may be added in the same manner as for a monomer. Examples of the polymerizable oligomer include an epoxy acrylate, an aliphatic urethane acrylate, an aromatic urethane acrylate, a polyester acrylate, and a straight chain acrylic oligomer.

As polymerizable compounds that can be preferably used in the effect pigment ink in the first embodiment of the present invention, group 1-1 below can be cited as examples. As described above, it is preferable to set the surface tension of the effect pigment ink at a low level relative to that of the transparent ink. The polymerizable compounds shown in group 1-1 have a relatively low surface tension, an effect pigment ink employing same has excellent curability, and a cured film obtained therefrom has excellent properties.

(Group 1-1)

octyl acrylate, decyl acrylate, lauryl acrylate, stearyl acrylate, isobornyl acrylate, isophoryl acrylate, 2-(2-ethoxyethoxy)ethyl acrylate, 1,6-hexanediol diacrylate, 3-methyl-1,5-pentanediol diacrylate, dipropylene glycol diacrylate, and propylene oxide-modified trimethylolpropane triacrylate With regard to the polymerizable compounds shown in group 1-1, one type may be used on its own or two or more types may be used in combination. Among them, octyl acrylate, decyl acrylate, isobornyl acrylate, 2-(2-ethoxyethoxy)ethyl acrylate, 1,6-hexanediol diacrylate, 3-methyl-1,5-pentanediol diacrylate, dipropylene glycol diacrylate, and PO-modified trimethylolpropane triacrylate are more preferable.

The effect pigment ink in the first embodiment of the present invention preferably comprises a polymerizable compound selected from group 1-1 above in an amount of at least 40 wt % of the entire polymerizable compounds, more preferably at least 50 wt %, and yet more preferably at least 60 wt %.

Furthermore, the content of the polymerizable compound in the effect pigment ink in the first embodiment of the present invention is preferably 20 to 80 wt % of the entire effect pigment ink, more preferably 30 to 70 wt %, and yet more preferably 40 to 60 wt %.

A polymerizable compound other than group 1-1 above is not particularly limited, and may be selected appropriately from the above monofunctional monomers and polyfunctional monomers, and monomers cited as examples in group 1-2, which is described later.

As polymerizable compounds that can suitably be used in the transparent ink in the first embodiment of the present invention, group 1-2 below can be cited. In the first embodiment of the present invention, as described above, it is preferable to set the surface tension of the transparent ink at a high level relative to that of the effect pigment ink. The polymerizable compounds shown in group 1-2 have a relatively high surface tension, a transparent ink employing same has excellent curability, and a cured film obtained therefrom has excellent properties.

(Group 1-2)

N-vinylcaprolactam, N-vinylformamide, N-vinylacetamide, N-methyl-N-vinylacetamide, tetrahydrofurfuryl acrylate, cyclic trimethylolpropane formal acrylate, 2-phenoxyethyl acrylate, triethylene glycol diacrylate, tetraethylene glycol diacrylate, trimethylolpropane triacrylate, and ethylene oxide-modified trimethylolpropane triacrylate Among them, group 1-2' below is more preferable, and group 1-3 is yet more preferable.

(Group 1-2') N-vinylcaprolactam, 2-phenoxyethyl acrylate, tetrahydrofurfuryl acrylate, and cyclic trimethylolpropane formal acrylate (Group 1-3) N-vinylcaprolactam and 2-phenoxyethyl acrylate With regard to the polymerizable compounds shown in group 1-2, group 1-2', and group 1-3, one type may be used on its own or two or more types may be used in combination.

The transparent ink in the first embodiment of the present invention preferably comprises a polymerizable compound selected from the group consisting of group 1-2 above in an amount of at least 60 wt % of the entire polymerizable compounds, more preferably at least 70 wt %, and yet more preferably at least 80 wt %.

Furthermore, it preferably comprises a polymerizable compound selected from the group consisting of group 1-3 above in an amount of at least 60 wt % of the entire polymerizable compounds, more preferably 70 wt %, and yet more preferably at least 80 wt %.

The content of the polymerizable compounds in the transparent ink in the first embodiment of the present invention is preferably 50 to 99 wt % of the entire transparent ink, more preferably 60 to 98 wt %, and yet more preferably 70 to 97 wt %.

A polymerizable compound other than group 1-2, group 1-2', and group 1-3 above is not particularly limited and may be selected appropriately from the above monofunctional monomers and polyfunctional monomers, and the monomers shown in group 1.

As polymerizable compounds that can suitably used in the effect pigment ink in the second embodiment of the present invention, group 2-1 below can be cited as examples. As described above, it is preferable to set the surface tension of the effect pigment ink at a high level relative to that of the transparent ink. The polymerizable compounds shown in group 2-1 have a relatively high surface tension, an effect pigment ink employing same has excellent curability, and a cured film obtained therefrom has excellent properties.

(Group 2-1)

N-vinylcaprolactam, N-vinylformamide, N-vinylacetamide, N-methyl-N-vinylacetamide, tetrahydrofurfuryl acrylate, cyclic trimethylolpropane formal acrylate, 2-phenoxyethyl acrylate, triethylene glycol diacrylate, tetraethylene glycol diacrylate, trimethylolpropane triacrylate, and ethylene oxide-modified trimethylolpropane triacrylate Among them, group 2-1' below is more preferable, and group 2-2 is yet more preferable.

(Group 2-1')

N-vinylcaprolactam, 2-phenoxyethyl acrylate, tetrahydrofurfuryl acrylate, and cyclic trimethylolpropane formal acrylate (Group 2-2)

N-vinylcaprolactam and 2-phenoxyethyl acrylate

With regard to the polymerizable compounds shown in group 2-1, group 2-1', and group 2-2, one type may be used on its own or two or more types may be used in combination.

The effect pigment ink in the second embodiment of the present invention preferably comprises a polymerizable compound selected from the group consisting of group 2-1 above in an amount of at least 20 wt % of the entire polymerizable compounds, more preferably at least 30 wt %, and yet more preferably at least 40 wt %.

Furthermore, it preferably comprises a polymerizable compound selected from the group consisting of group 2-2 above in an amount of at least 25 wt % of the entire polymerizable compounds, more preferably 35 wt %, and yet more preferably at least 45 wt %.

The content of the polymerizable compounds in the effect pigment ink in the second embodiment of the present invention is preferably 50 to 99 wt % of the entire effect pigment ink, more preferably 60 to 98 wt %, and yet more preferably 70 to 97 wt %.

A polymerizable compound other than group 2-1, group 2-1', and group 2-2 above is not particularly limited and may be selected appropriately from the above monofunctional monomers and polyfunctional monomers, and the monomers shown in group 2-1 below.

As polymerizable compounds that can suitably used in the transparent ink in the second embodiment of the present invention, group 2-3 below can be cited as examples. In the second embodiment of the present invention, as described above, it is preferable to set the surface tension of the transparent ink at a low level relative to that of the effect pigment ink. The polymerizable compounds shown in group 2-3 have a relatively low surface tension, a transparent ink employing same has excellent curability, and a cured film obtained therefrom has excellent properties.

(Group 2-3)

octyl acrylate, decyl acrylate, lauryl acrylate, stearyl acrylate, isobornyl acrylate, isophoryl acrylate, 2-(2-ethoxyethoxy)ethyl acrylate, 1,6-hexanediol diacrylate, 3-methyl-1,5-pentanediol diacrylate, dipropylene glycol diacrylate, and propylene oxide-modified trimethylolpropane triacrylate With regard to the polymerizable compounds shown in group 2-3, one type may be used on its own or two or more types may be used in combination. Among them, a polymerizable compound selected from the group consisting of group 2-4 below is more preferable.

(Group 2-4)

Isobornyl acrylate, isophoryl acrylate, and 2-(2-ethoxyethoxy)ethyl acrylate

The transparent ink in the second embodiment of the present invention preferably comprises a polymerizable compound selected from the group consisting of group 2-3 above in an amount of at least 40 wt % of the entire polymerizable compounds, more preferably at least 50 wt %, and yet more preferably at least 60 wt %.

Furthermore, the transparent ink in the second embodiment of the present invention preferably comprises a polymerizable compound selected from the group consisting of group 2-4 above in an amount of at least 40 wt % of the entire polymerizable compounds, more preferably at least 50 wt %, and yet more preferably at least 60 wt %.

The content of the polymerizable compounds in the transparent ink in the second embodiment of the present invention is preferably 20 to 80 wt % of the entire transparent ink, more preferably 30 to 70 wt %, and yet more preferably 40 to 60 wt %.

A polymerizable compound other than groups 2-3 and 2-4 above is not particularly limited and may be selected appropriately from the above monofunctional monomers and polyfunctional monomers, and the monomers shown in group 2-2, which is described later.

As the polymerizable compound of the colored ink in the first embodiment of the present invention, a (meth)acrylate monomer described above is preferable, but it is not limited thereto; a monomer cited in group 1-1 to group 1-3 above may be used, and there is no particular limitation.

As the polymerizable compound of the colored ink in the second embodiment of the present invention, a (meth)acrylate monomer described above is preferable, but it is not limited thereto; a monomer cited in group 2-1 to group 2-4 above may be used, and there is no particular limitation.

The content of the polymerizable compound in the colored ink is preferably 50 to 95 wt % of the entire color ink, more preferably 60 to 90 wt %, and yet more preferably 70 to 85 wt %.

(Polymerization Initiator)

Inks (a transparent ink, an effect pigment ink and a colored ink) that can be used in the present invention comprise a polymerization initiator.

The polymerization initiator is a compound that forms a polymerization initiating species by absorbing external energy such as above-mentioned actinic radiation. The polymerization initiator may be used singly or in a combination of two or more compounds.

Preferred examples of the polymerization initiator that can be used in the present invention include a radical polymerization initiator, more preferred examples thereof include a radical photopolymerization initiator, and yet more preferred examples thereof include an α-aminoacetophenone compound, an α-hydroxy ketone compound, an acylphosphine oxide compound, an aromatic onium salt compound, an organic peroxide, a thio compound, a hexaarylbiimidazole compound, a ketoxime ester compound, a borate compound, an azinium compound, a metallocene compound, an active ester compound, and a compound having a carbon-halogen bond. Specific examples of the polymerization initiator include radical polymerization initiators described in JP-A-2008-208190 or JP-A-2010-013574.

As the polymerization initiator of the transparent ink, from the viewpoint of curability and coloring, an α-aminoacetophenone compound, an α-hydroxyketone compound, and an acylphosphine oxide compound can be cited as more preferable examples. When a compound represented by Formula (I), which is described later, is added, it is preferable to use an acylphosphine oxide compound and/or an α-aminoacetophenone compound as the polymerization initiator, and it is more preferable to use at least one type of acylphosphine oxide compound and at least one type of α-aminoacetophenone compound in combination.

The total content of the polymerization initiator in the transparent ink is preferably 15 to 2 wt % of the entire transparent ink from the viewpoint of curability and uniform curability, more preferably 12 to 4 wt %, and yet more preferably 10 to 5 wt %. With regard to the polymerization initiator, one type may be used on its own or two or more types may be used in combination.

As the polymerization initiator of the effect pigment ink, from the viewpoint of curability and uniform curability, an α-aminoacetophenone compound, an α-hydroxyketone compound, and an acylphosphine oxide compound can be cited as more preferable examples. Furthermore, it is yet more preferable to use an acylphosphine oxide compound and a compound represented by Formula (I) below or a thioxanthone compound in combination.

The total content of the polymerization initiator in the effect pigment ink is preferably 20 to 4 wt % of the entire effect pigment ink from the viewpoint of curability and uniformity of curing, more preferably 18 to 5 wt %, and yet more preferably 16 to 6 wt %. With regard to the polymerization initiator, one type may be used on its own or two or more types may be used in combination.

The polymerization initiator of the colored ink may be selected appropriately according to the polymerizable compound, etc. used, and is not particularly limited.

The total content of the polymerization initiator of the colored ink is preferably 20 to 4 wt % of the entire colored ink from the viewpoint of curability, more preferably 18 to 5 wt %, and yet more preferably 16 to 6 wt %. With regard to the polymerization initiator, one type may be used on its own or two or more types may be used in combination.

When a sensitizer is used, the total content of the polymerization initiator relative to the content of the sensitizer is preferably 200:1 to 1:200 as a ratio by weight of polymerization initiator:sensitizer, more preferably 50:1 to 1:50, and yet more preferably 20:1 to 1:5.

When a sensitizer is used, the content of the sensitizer in the ink is 0.01 to 20 wt % relative to the total weight of the ink from the viewpoint of ink coloration, more preferably 0.1 to 15 wt %, and yet more preferably 0.5 to 10 wt %.

(Sensitizer)

In the present invention, it is preferable for the transparent ink to comprise as a sensitizer a compound represented by Formula (I) below. It is preferable for it to comprise a compound represented by Formula (I) since the sensitivity improves and coloration due to the polymerization initiator, etc. can be suppressed.

In addition, the effect pigment ink and/or the colored ink comprising a compound represented by Formula (I) below is not excluded.

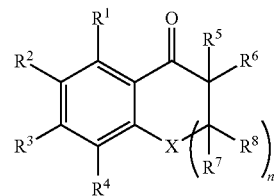

(I)

In Formula (I) above, X denotes O, S, or NR. R denotes a hydrogen atom, an alkyl group, or an acyl group, and preferably an alkyl group or an acyl group.

In Formula (I) above, n denotes 0 or 1.

X is preferably O or S, and more preferably S.

When n is 0, the carbon atom bonded to $R^7$ and $R^8$ is not present, and X, comprising a heteroatom, and the carbon atom bonded to $R^5$ and $R^6$ are directly bonded to each other, thus forming a five-membered heterocycle containing X.

$R^1$, $R^2$, $R^3$, $R^4$, $R^5$, $R^6$, $R^7$, and $R^8$ independently denote a hydrogen atom or a monovalent substituent.

When $R^1$, $R^2$, $R^3$, $R^4$, $R^5$, $R^6$, $R^7$, and $R^8$ denote a monovalent substituent, examples of the monovalent substituent include a halogen atom, an aliphatic group, an aromatic group, a heterocyclic group, a cyano group, a hydroxy group, a nitro group, an amino group, an alkylamino group, a dialkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, an acyl group, a carboxyl group, and a sulfo group. Among them, an alkyl group or a halogen atom are preferable.

When $R^1$, $R^2$, $R^3$, $R^4$, $R^5$, $R^6$, $R^7$, and $R^8$ in Formula (I) denote a monovalent substituent, preferred examples of the alkyl group include an alkyl group having 1 to 10 carbons, and more preferred examples of the alkyl group include those having 1 to 4 carbons such as a methyl group, an ethyl group, a propyl group, an n-butyl group, a sec-butyl group, and a t-butyl group.

Similarly, preferred examples of the alkoxy group include those having 1 to 4 carbons such as a methoxy group, an ethoxy group, a hydroxyethoxy group, a propoxy group, an n-butoxy group, an isobutoxy group, a sec-butoxy group, and a t-butoxy group.

Examples of the halogen atom include a fluorine atom, a chlorine atom, a bromine atom, and an iodine atom.

Of $R^1$, $R^2$, $R^3$, and $R^4$, two adjacent ones may be bonded (for example fused) to each other to form a ring.

Examples of the ring structure when they form a ring include a 5- or 6-membered aliphatic ring or aromatic ring; it may be a heterocyclic structure comprising an element other than a carbon atom, or rings that are formed may be further combined to form a bicyclic ring, for example, a fused ring. Furthermore, these ring structures may further comprise a substituent that is cited as an example when in Formula (I) above $R^1$ to $R^8$ have a monovalent substituent. Examples of the heteroatom when a ring that is formed is a heterocyclic structure include N, O, and S.

When n=1, $R^5$ or $R^6$ and $R^7$ or $R^8$ may be bonded to each other to form an aliphatic ring, but do not form an aromatic ring. The aliphatic ring is preferably a 3- to 6-membered ring, and more preferably a 5- or 6-membered ring.

The compound represented by Formula (I) is preferably a compound represented by Formula (I-A) below.

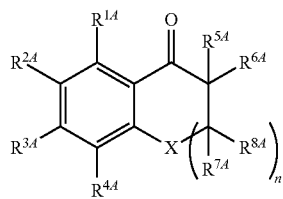

(I-A)

In Formula (I-A) above, X denotes O or S, n denotes 0 or 1, $R^{1A}$, $R^{2A}$, $R^{3A}$, $R^{4A}$, $R^{5A}$, $R^{6A}$, $R^{7A}$, and $R^{8A}$ independently denote a hydrogen atom, a halogen atom, an alkyl group, a hydroxy group, a cyano group, a nitro group, an amino group, an alkylthio group, an alkylamino group, an alkoxy group, an alkoxycarbonyl group, an acyloxy group, an acyl group, a carboxyl group, or a sulfo group.

Of $R^{1A}$, $R^{2A}$, $R^{3A}$, and $R^{4A}$, two adjacent ones may be bonded (fused) to each other to form a ring. $R^{5A}$ or $R^{6A}$ and $R^{7A}$ or $R^{8A}$ may be bonded to each other to form an aliphatic ring, but do not form an aromatic ring.

Furthermore, these ring structures may further comprise a substituent that is cited as an example when in Formula (I) above $R^1$, $R^2$, $R^3$, $R^4$, $R^5$, $R^6$, $R^7$, or $R^8$ have a monovalent substituent. Examples of the heteroatom when a ring that is formed is a heterocyclic structure include N, O, and S.

Furthermore, the compound represented by Formula (I) is more preferably a compound represented by Formula (I-B) below.

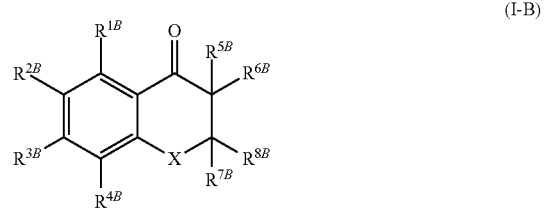

(I-B)

In Formula (I-B) above, X denotes O or S, $R^{1B}$, $R^{2B}$, $R^{3B}$, $R^{4B}$, $R^{5B}$, $R^{6B}$, $R^{7B}$, and $R^{8B}$ independently denote a hydrogen atom, a halogen atom, an alkyl group, a hydroxy group, a cyano group, a nitro group, an amino group, an alkylthio group, an alkylamino group, an alkoxy group, an alkoxycarbonyl group, an acyloxy group, an acyl group, a carboxyl group, or a sulfo group.

Of $R^{1B}$, $R^{2B}$, $R^{3B}$, and $R^{4B}$, two adjacent ones may be bonded (fused) to each other to form a ring. $R^{5B}$ or $R^{6B}$ and $R^{7B}$ or $R^{8B}$ may be bonded to each other to form an aliphatic ring, but do not form an aromatic ring.

Furthermore, these ring structures may further comprise a substituent that is cited as an example when in Formula (I) above $R^1$, $R^2$, $R^3$, $R^4$, $R^5$, $R^6$, $R^7$, or $R^8$ have a monovalent substituent. Examples of the heteroatom when a ring that is formed is a heterocyclic structure include N, O, and S.

Furthermore, the compound represented by Formula (I) is yet more preferably a compound represented by Formula (I-C) below.

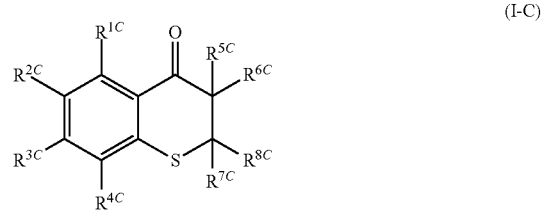

(I-C)

In Formula (I-C) above, $R^{1C}$, $R^{2C}$, $R^{3C}$, $R^{4C}$, $R^{5C}$, $R^{6C}$, $R^{7C}$, and $R^{8C}$ independently denote a hydrogen atom, a halogen atom, an alkyl group, a hydroxy group, a cyano group, a nitro group, an amino group, an alkylthio group, an alkylamino group, an alkoxy group, an alkoxycarbonyl group, an acyloxy group, an acyl group, a carboxyl group, or a sulfo group.

Of $R^{1C}$, $R^{2C}$, $R^{3C}$, and $R^{4C}$, two adjacent ones may be bonded (for example fused) to each other to form a ring, these ring structures may be a heterocyclic structure comprising an element other than a carbon atom, or rings that are formed may be further combined to form a bicyclic ring, for example, a fused ring. $R^{5C}$ or $R^{6C}$ and $R^{7C}$ or $R^{8C}$ may be bonded to each other to form an aliphatic ring, but do not form an aromatic ring.

Furthermore, these ring structures may further comprise a substituent that is cited as an example when in Formula (I) above $R^1$, $R^2$, $R^3$, $R^4$, $R^5$, $R^6$, $R^7$, or $R^8$ have a monovalent substituent. Examples of the heteroatom when a ring that is formed is a heterocyclic structure include N, O, and S.

At least one of $R^{1C}, R^{2C}, R^{3C}, R^{4C}, R^{5C}, R^{6C}, R^{7C}$, and $R^{8C}$ is preferably a halogen atom. Preferable substituted position is preferably $R^{1C}, R^{2C}, R^{3C}$, or $R^{4C}$, and most preferably $R^{2C}$. The amount of the halogen atom in $R^{1C}$ to $R^{8C}$ is preferably one or two, and more preferably one.

$R^{2C}$ is preferably a substituent other than a hydrogen atom, among them, in order to good matching to a light source and high sensitivity, an alkyl group, a halogen atom, an acyloxy group, or an alkoxycarbonyl group is preferable, and an alkyl group or a halogen atom is more preferable.

Either $R^{7C}$ or $R^{8C}$ is preferably a substituent other than a hydrogen atom, and $R^{7C}$ and $R^{8C}$ are more preferably a substituent other than a hydrogen atom. The substituent is preferably an alkyl group, a halogen atom, an acyloxy group, or an alkoxycarbonyl group is preferable, and an alkyl group is more preferable.

Examples of the halogen atom include fluorine atom, chlorine atom, bromine atom, and iodine atom, chlorine atom, bromine atom, or iodine atom is preferable.

The alkyl group is preferably an alkyl group having 1 to 10 carbon atoms, and more preferably those having 1 to 4 carbons such as a methoxy group, an ethoxy group, a hydroxyethoxy group, a propoxy group, an n-butoxy group, an isobutoxy group, a sec-butoxy group, and a t-butoxy group.

The acyloxy group is preferably an aliphatic acyloxy group having 2 to 10 carbon atoms, and more preferably an aliphatic acyloxy group having 2 to 5 carbon atoms.

The alkoxycarbonyl group is preferably an aliphatic alkoxycarbonyl group having 2 to 10 carbon atoms, and more preferably an alkoxycarbonyl group having 2 to 5 carbon atoms.

Specific examples (compound examples (I-1) to (I-133)) of the compound represented by Formula (I) preferably used in the present invention are listed below, but the present invention is not limited thereto. In a part of chemical formula in the present invention, in some of the structural formulae a hydrocarbon chain is represented by a simplified structural formula in which symbols for carbon (C) and hydrogen (H) are omitted. In specific examples, Me denotes a methyl group, $Bu^t$ denotes a tert-butyl group, and $Pr^i$ denotes an isopropyl group.

(I-1)

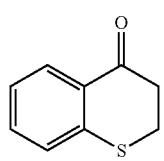

(I-2)

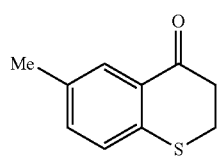

(I-3)

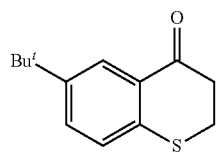

-continued (I-4)

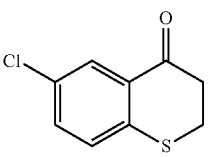

(I-5)

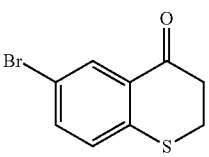

(I-6)

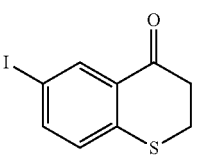

(I-7)

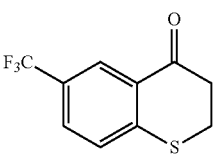

(I-8)

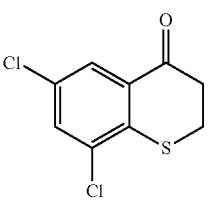

(I-9)

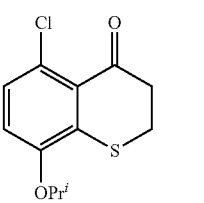

(I-10)

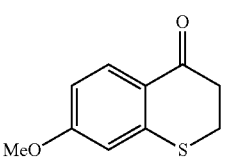

(I-11)

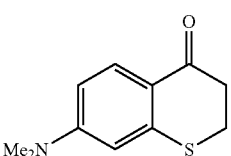

(I-12)

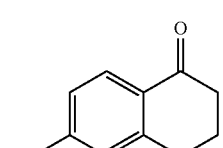

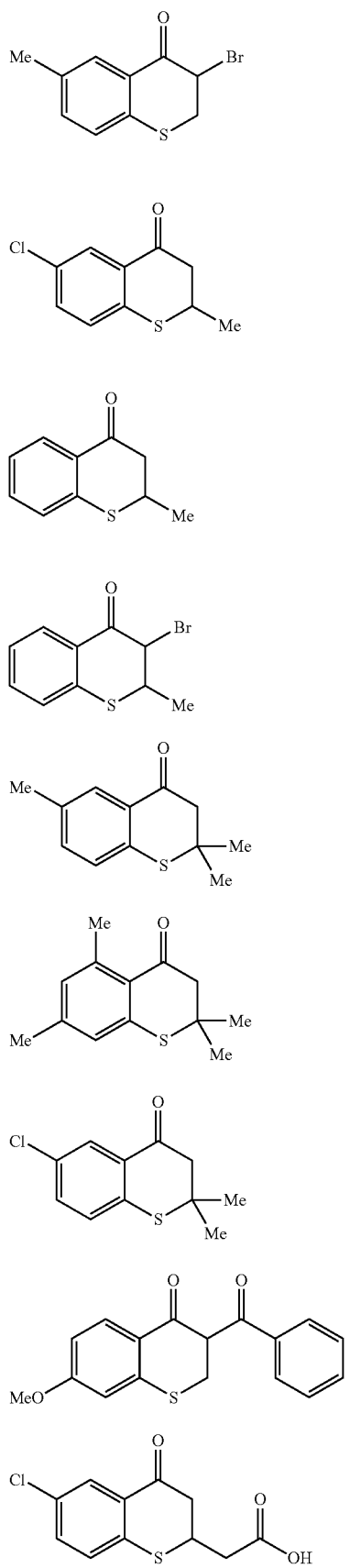
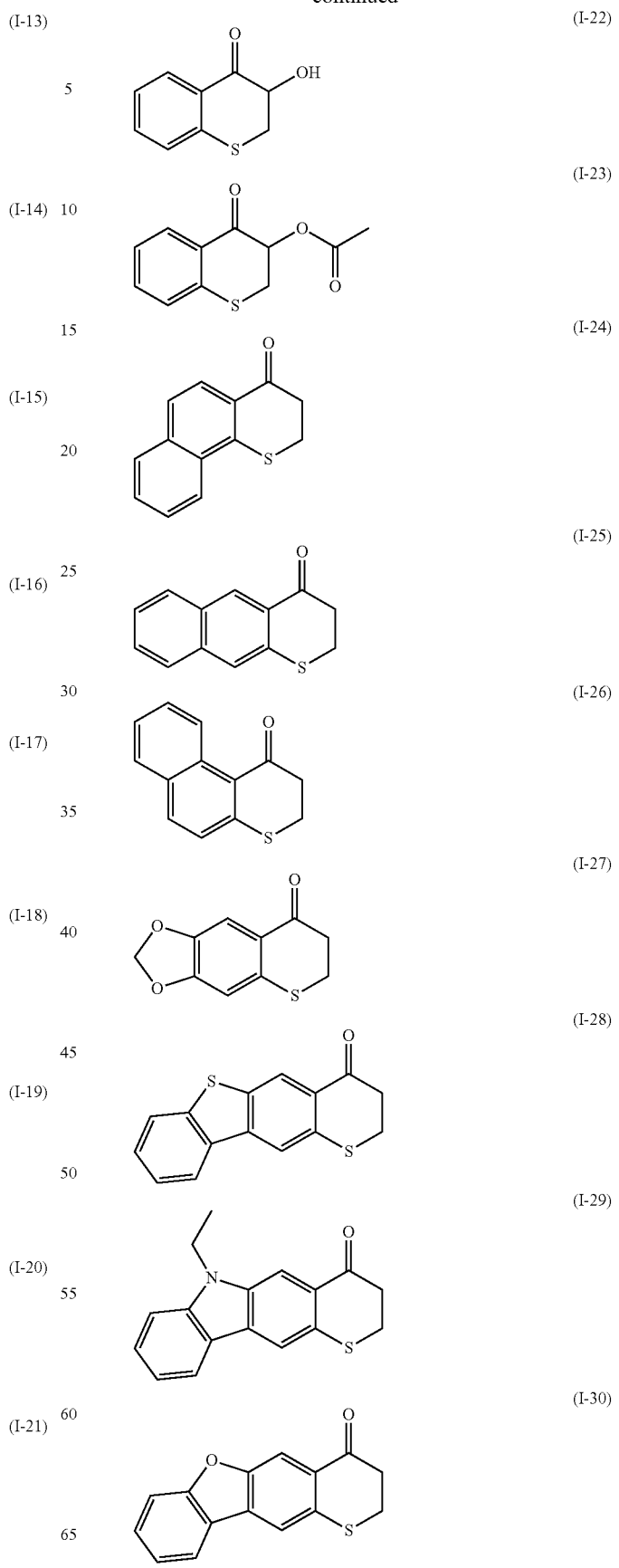

(I-31)
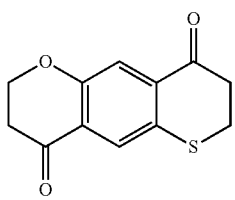
(I-32)
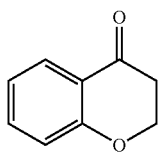
(I-33)
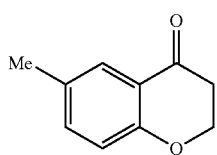
(I-34)
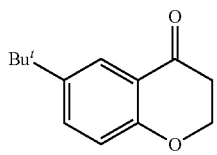
(I-35)
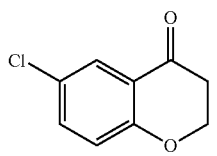
(I-36)
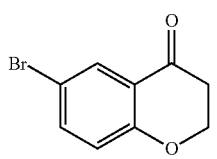
(I-37)
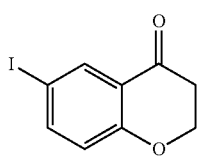
(I-38)
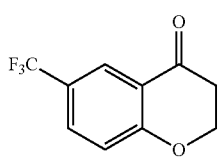
(I-39)
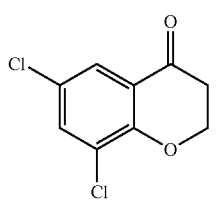
(I-40)
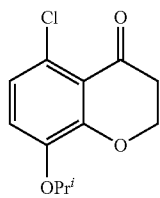
(I-41)
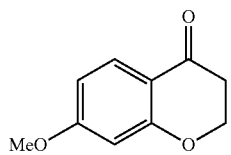
(I-42)
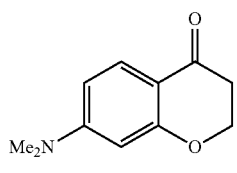
(I-43)
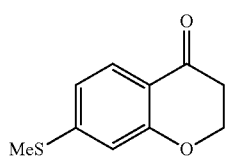
(I-44)
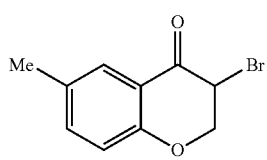
(I-45)
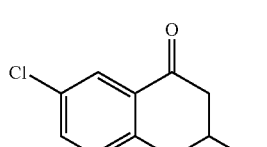
(I-46)
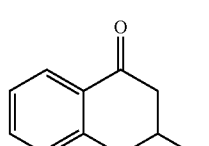
(I-47)
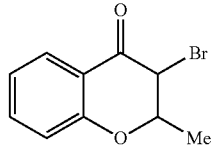
(I-48)
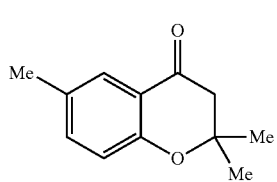

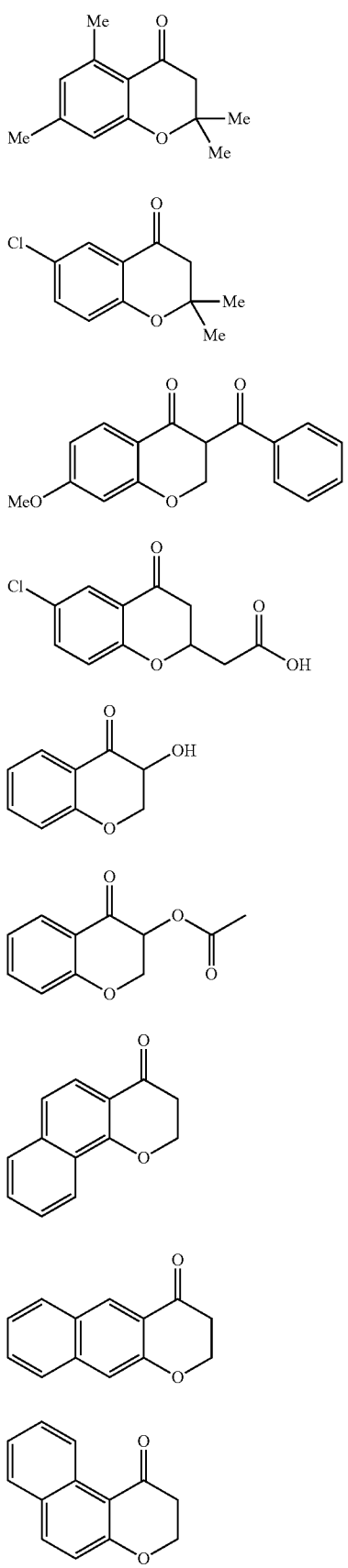
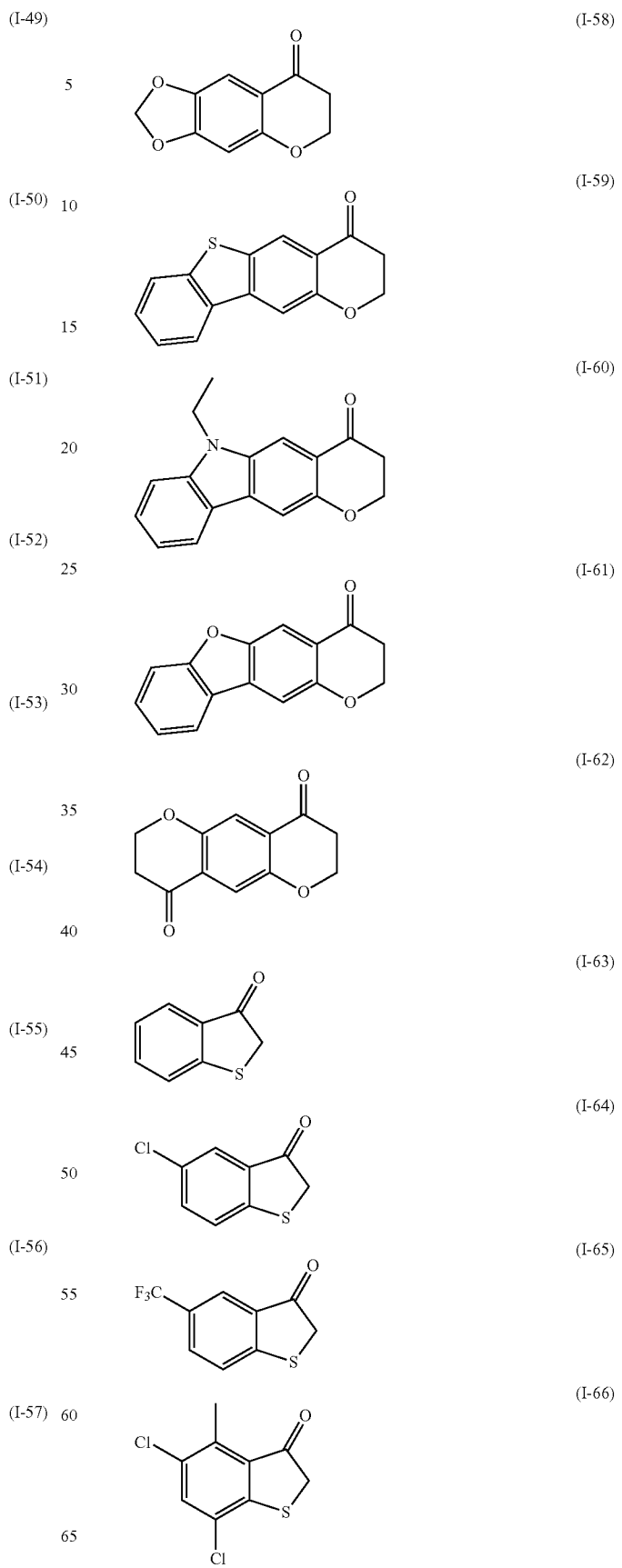

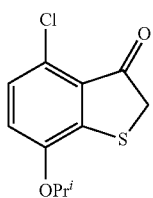 (I-67)
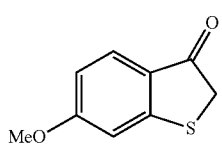 (I-68)
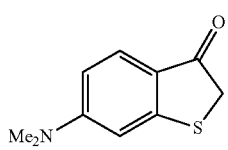 (I-69)
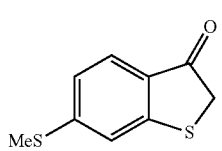 (I-70)
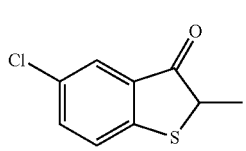 (I-71)
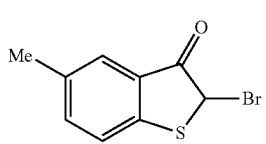 (I-72)
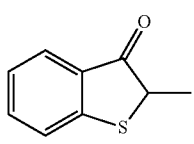 (I-73)
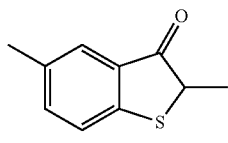 (I-74)
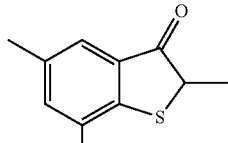 (I-75)
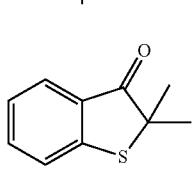 (I-76)
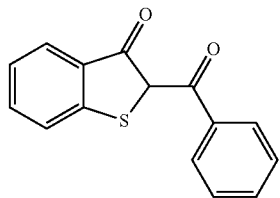 (I-77)
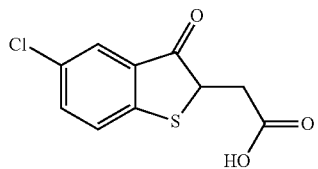 (I-78)
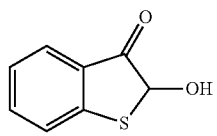 (I-79)
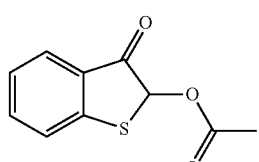 (I-80)
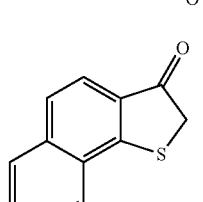 (I-81)
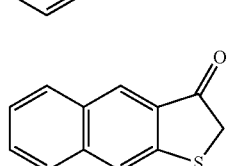 (I-82)
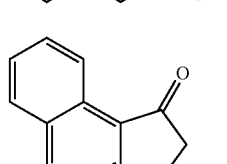 (I-83)
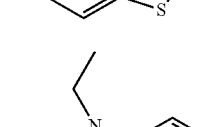 (I-84)
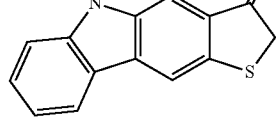 (I-85)
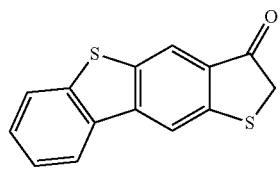

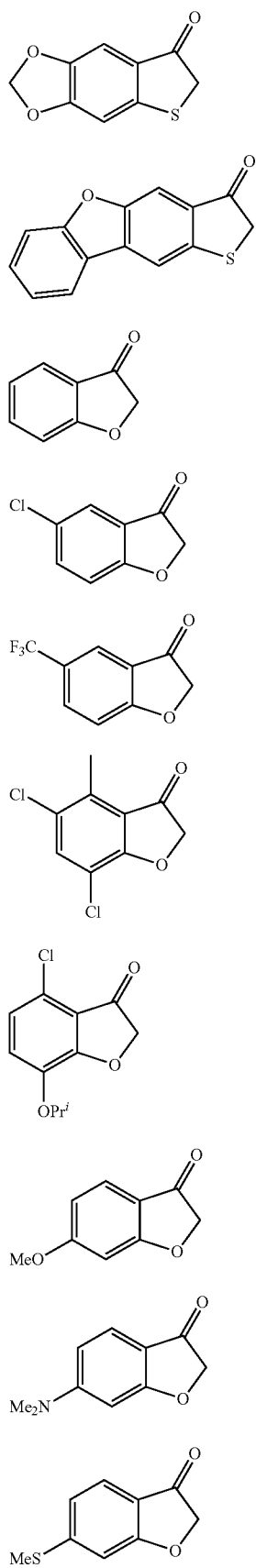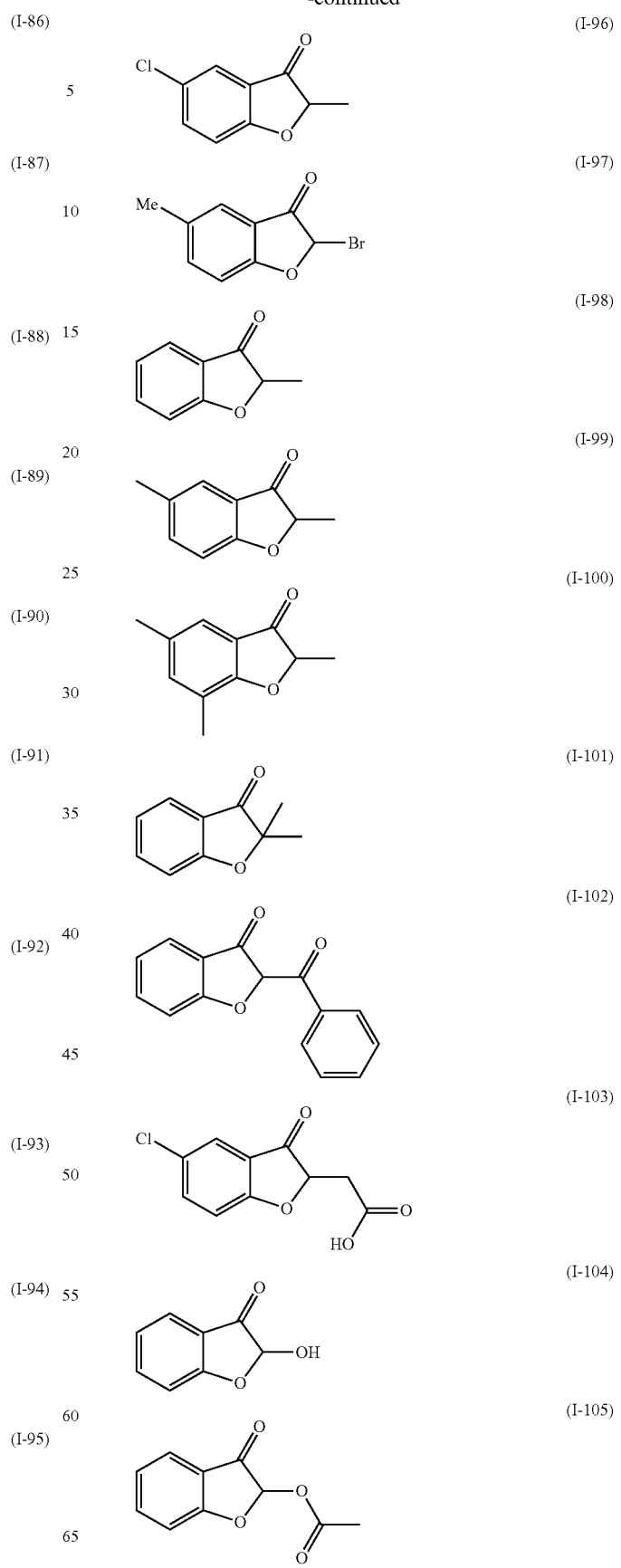

(I-106) 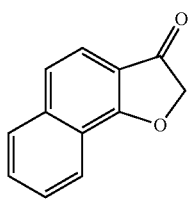
(I-107) 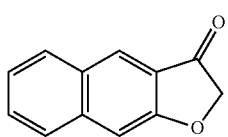
(I-108) 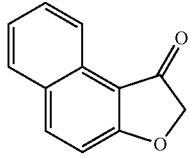
(I-109) 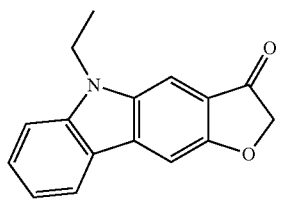
(I-110) 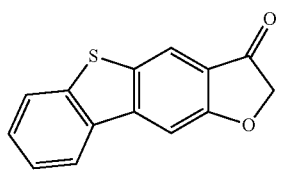
(I-111) 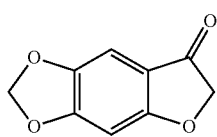
(I-112) 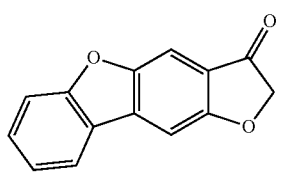
(I-113) 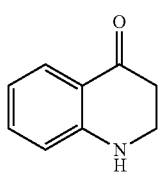
(I-114) 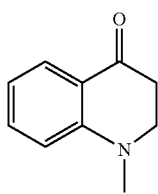
(I-115) 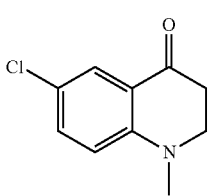
(I-116) 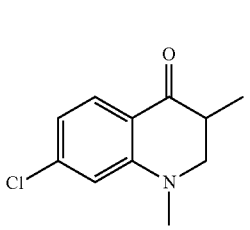
(I-117) 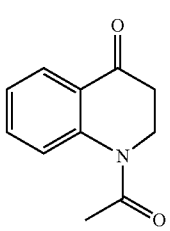
(I-118) 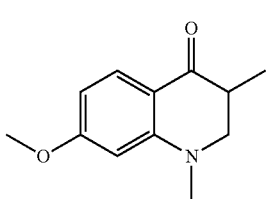
(I-119) 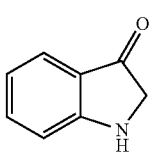
(I-120) 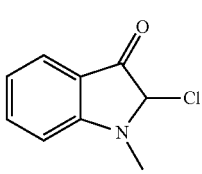
(I-121) 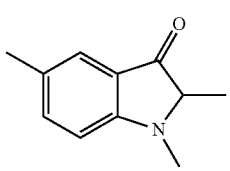
(I-122) 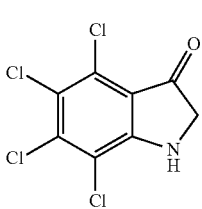

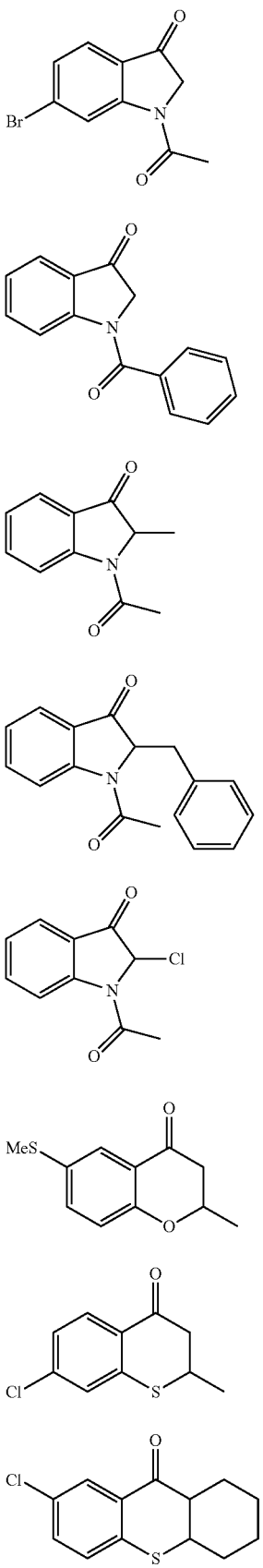
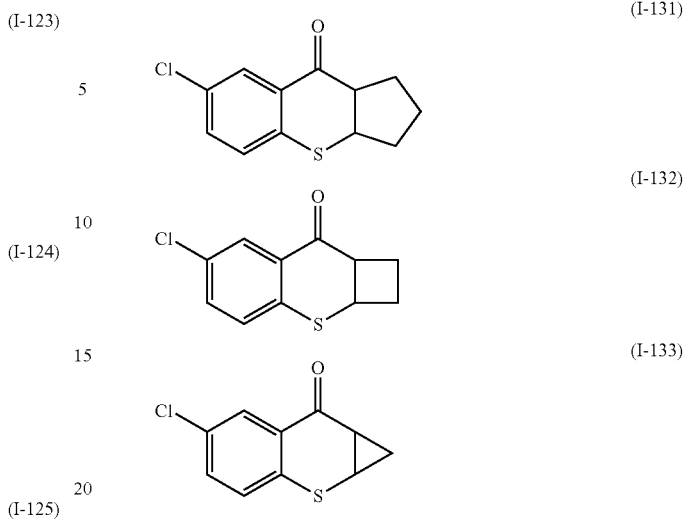

Among them, compound examples (I-2), (I-4), (I-5), (I-14), and (I-15) are preferable, and compound example (I-14) is particularly preferable.

A method for synthesizing the compound represented by Formula (I) is not particularly limited; a known method may be used, and synthesis is possible by a known method described in, for example, JP-A-2004-189695, Tetrahedron, Vol. 49, p 939 (1993), Journal of Organic Chemistry, p. 893 (1945), and Journal of Organic Chemistry, p. 4939 (1965), etc.

With regard to the compound represented by Formula (I), from the viewpoint of achieving a balance between curability and prevention of bleeding out from a cured film of the compound, which is a noncurable component, the concentration thereof added to the ink is preferably at least 0.5 wt % but no greater than 25.0 wt % relative to the total weight of the ink, more preferably at least 1.0 wt % but no greater than 20.0 wt %, and particularly preferably at least 1.0 wt % but no greater than 15.0 wt %.

In addition, since the compound represented by Formula (I) shows hardly any absorption in the visible light region, it has the advantage that there is no possibility of having an effect on the hue of the ink even when an amount that can exhibit an effect as a sensitizer is added. In the case of the transparent ink in particular, although there is the problem that when a sensitizer is used the hue of the ink easily changes, the compound represented by Formula (I) above can impart high curability (high sensitivity) to the transparent ink without causing such a change in the hue.

The inks (a transparent ink, an effect pigment ink and a colored ink) that can be used in the present invention may contain another sensitizer in order to promote decomposition of the photopolymerization initiator by absorbing specific actinic radiation.

Examples of the other sensitizer include polynuclear aromatic compounds (e.g. pyrene, perylene, triphenylene, 2-ethyl-9,10-dimethoxy anthracene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), coumarins (e.g. 7-diethylamino-4-methylcoumarin), and thioxantones (e.g. thioxantone, 2-isopropylthioxantone, 4-isopropylthioxantone).

Among them, a thioxanthone can be cited as a preferred example.

Furthermore, with regard to the sensitizer, one type may be used on its own or two or more types may be used in combination.

(Effect Pigment)

The effect pigment referred to in the present invention means any pigment that has a thin plate-shaped structure and imparts a special decorative color effect to a surface coating. Examples of the effect pigment include a pure metal pigment such as aluminum, iron, or copper, and an interference pigment or a liquid crystal pigment such as mica coated with titanium dioxide, mica coated with iron oxide, mica coated with a mixed oxide (e.g. coated with titanium dioxide and $Fe_2O_3$ or with titanium dioxide and $Cr_2O_3$), or aluminum coated with a metal oxide.

Among them, the effect pigment is preferably a metal pigment or a pearl pigment.

The metal pigment is particularly preferably an aluminum material, and examples include aluminum powder, aluminum paste, and aluminum flakes. The aluminum powder is a metallic pigment containing no solvent component and includes a material of a type in which aluminum particles are coated with a resin such as an acrylic resin. Furthermore, the aluminum paste is a material formed by subjecting scale-shaped fine particles of aluminum to a surface treatment and making them into a paste with an organic solvent, etc. Moreover, as one example of the aluminum flakes, a material of a type in which an aluminum vapor-deposited film is made into a pigment can be cited.

As the pearl pigment, white pearl formed by subjecting mica to fine powdering and a surface treatment can be cited.

In the present invention, the effect pigment is of plate-shaped particles, and the shape of the effect pigment preferably satisfies relationships (1) and (2) below.

$$0.5 \ \mu m \leq R_{50} \leq 5 \ \mu m \quad (1)$$

$$R_{50}/d > 5 \quad (2)$$

(In relationship (1) and relationship (2), $R_{50}$ is the 50% average particle size as an equivalent circle diameter obtained from the area of the plane of the particles, and d is the plate thickness.)

The plate-shaped particles referred to here mean particles having a substantially flat face (X-Y plane) and a substantially uniform thickness (Z). Here, the major axis on the plane of the plate-shaped particle is defined as X, the minor axis is defined as Y, and the thickness is defined as Z.

When the major axis on the plane of the plate-shaped particles is defined as X, the minor axis is defined as Y, and the thickness is defined as Z, $R_{50}$ is the 50% average particle size as an equivalent circle diameter obtained from the area of the X-Y plane of the plate-shaped particles.

The equivalent circle diameter is the diameter of a circle that has the same projection area as the projection area of the substantially flat face (X-Y plane) of the plate-shaped particle. When the substantially flat face (X-Y plane) of the plate-shaped particle is a polygon, the projection face of the polygon is converted into a circle, and the diameter of this circle is defined as the equivalent circle diameter of the plate-shaped particle.

The $R_{50}$ of the effect pigment is preferably 0.5 μm to 5 μm from the viewpoint of surface gloss, discharge stability, etc., more preferably 0.7 to 4 μm, and yet more preferably 1 to 3 μm.

Furthermore, the relationship between the $R_{50}$ and the thickness d of the plate-shaped particles is preferably $R_{50}/d > 5$ from the viewpoint of obtaining high surface gloss. $R_{50}/d$ is more preferably at least 6, and yet more preferably at least 8.

The $R_{50}$ can be measured using a particle image profiler such as for example an FPIA-2100, FPIA-300, or FPIA-3000S flow type particle image profiler manufactured by Sysmex Corporation.

Furthermore, the thickness d may be measured from an SEM image.

In the present invention, the effect pigment is preferably of plate-shaped particles that satisfy relationship (1) and relationship (2) above, and more preferably a metal pigment or a pearl pigment that satisfies relationship (1) and relationship (2).

Examples of the pearl pigment in the form of plate-shaped particles include clay minerals having a layered structure such as mica, talc, kaolin, bentonite, smectite, sepiolite, vermiculite, montmorillonite, and sericite. Furthermore, a plate-shaped pigment that has an improved pearl gloss by coating a material that has been processed into a plate shape, such as mica that has been processed into a plate shape, with titanium dioxide or iron oxide so as to form multiple layers of a thin film can also be suitably used.

The metal pigment as the plate-shaped particles is preferably aluminum or an aluminum alloy. When an aluminum alloy is used, another metal element or a non-metal element that is added to aluminum is not particularly limited as long as it has a metallic gloss; examples include silver, gold, platinum, nickel, chromium, tin, zinc, indium, titanium, and copper, and at least one selected from the group consisting of simple elements thereof, alloys thereof, and mixtures thereof may be used.

A method for preparing the effect pigment as the plate-shaped particles is not particularly limited; examples include (1) a method for obtaining plate-shaped particles by preparing a starting complex pigment having a structure in which a release resin layer and a metal or metal compound layer are sequentially layered on a sheet-like substrate face, peeling the metal or metal compound layer from the sheet-like substrate with the interface between the metal or metal compound layer and the release resin layer as a boundary, and finely grinding it and (2) a method in which molten aluminum is atomized and spherical particles thus obtained are ground using a pearl mill, a ball mill, etc., and JP-A-2008-239951, published Japanese translation 2010-533747 of a PCT application, etc., may be referred to.

In method (1) above, a plurality of metal or metal alloy layers may be layered. Furthermore, in methods (1) and (2) above, another layer may be layered on the metal or metal alloy layer, and examples of the other layer include a protective layer. Examples of the protective layer include a layer formed from a metal oxide such as silicon oxide, alumina, or titanium oxide and/or an organic polymer such as polyvinyl alcohol, polyethylene glycol, polyacrylamide, or a cellulose derivative.

In the present invention, the effect pigment is preferably of plate-shaped particles formed from multiple thin layers, and examples include an effect pigment obtained by the methods above. It is preferable for the effect pigment to be formed from multiple thin layers since prominent optical characteristics can be obtained.

Furthermore, the material of the effect pigment is preferably aluminum or an aluminum alloy from the viewpoint of ready availability and glitter.

The content of the effect pigment in the effect pigment ink is not particularly limited and may be selected appropriately according to color and intended application, but is preferably 1 to 50 wt % relative to the weight of the entire effect pigment ink, more preferably 3 to 40 wt %, and particularly preferably 5 to 30 wt %.

(Surfactant)

In the present invention, the transparent ink, the effect pigment ink, and the colored ink may comprise a surfactant. Since the effect pigment ink in the first embodiment of the present invention in particular preferably has a low surface tension relative to that of the transparent ink, the effect pigment ink in the first embodiment of the present invention preferably comprises a surfactant. Furthermore, since the transparent ink in the second embodiment of the present invention in particular preferably has a low surface tension relative to that of the effect pigment ink, the transparent ink in the second embodiment of the present invention preferably comprises a surfactant.

Examples of the surfactant used in the present invention include the surfactants below. For example, those described in JP-A-62-173463 and JP-A-62-183457 can be cited. Specific examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. As the above known surfactants, an organofluoro compound may be used. The organofluoro compound is preferably hydrophobic. Examples of the organofluoro compound include fluorine-based surfactants, oil-like fluorine-based compounds (e.g. fluorine oils), and solid fluorine compound resins (e.g. tetrafluoroethylene resin), and those described in JP-B-57-9053 (JP-B denotes a Japanese examined patent application publication) (8th to 17th columns) and JP-A-62-135826.

The surfactant used in the present invention is not particularly limited to the surfactants described above, and it may be an additive that, for the concentration added, is capable of reducing the surface tension efficiently.

In the present invention, when an ionic surfactant such as a nonionic surfactant or an anionic surfactant is used, the stability of the transparent ink and the effect pigment ink is degraded in some cases. Because of this, a nonionic surfactant is preferable, and use of a nonionic hydrocarbon-based surfactant is more preferable.

Examples of the nonionic hydrocarbon-based surfactant include a long-chain alkyl acrylate polymer, a polyoxyethylene alkyl ether, and a carboxylic acid alkanolamide, and from the viewpoint of excellent compatibility with a polymerizable monomer a long-chain alkyl acrylate polymer is preferable.

The amount of surfactant added is not particularly limited, but from the viewpoint of stable discharge properties and surface tension being in a desired range, it is preferably 2.0 to 0.01 weight % of the entire ink, more preferably 0.5 to 0.05 weight %, and particularly preferably 0.2 to 0.05 weight %.

(Colorant)

In the present invention, the colored ink comprises at least a colorant.

The colorant that can be used in the present invention is not particularly limited, and various known pigments and dyes may be selected appropriately according to an intended application. Among them, as a colorant contained in the colored ink, a pigment is preferable particularly from the viewpoint of excellent light fastness. The colorant contained in the colored ink means a colorant other than the effect pigment.

A pigment that is preferably used as a colorant in the present invention is now described.

With regard to the pigments, there is no particular limitation, and any generally commercially available organic pigment and inorganic pigment, resin particles dyed with a dye, etc. may be used. Furthermore, a commercial pigment dispersion or a surface-treated pigment such as, for example, a dispersion of a pigment in an insoluble resin, etc. as a dispersion medium or a pigment having a resin grafted on the surface, etc. may be used as long as the effects of the present invention are not impaired.

Examples of these pigments include pigments described in, for example, 'Ganryo no Jiten (Pigment Dictionary)', Ed. by Seishiro Ito (2000), W. Herbst, K. Hunger, Industrial Organic Pigments, JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as C.I. Pigment Yellow 1 (Fast Yellow G, etc.) and C.I. Pigment Yellow 74, disazo pigments such as C.I. Pigment Yellow 12 (Disazo Yellow AAA, etc.) and C.I. Pigment Yellow 17, benzidine-free azo pigments such as C.I. Pigment Yellow 180 and C.I. Pigment Yellow 200 (Novoperm Yellow 2HG), azo lake pigments such as C.I. Pigment Yellow 100 (Tartrazine Yellow Lake, etc.), condensed azo pigments such as C.I. Pigment Yellow 95 (Azo Condensation Yellow GR, etc.), acidic dye lake pigments such as C.I. Pigment Yellow 115 (Quinoline Yellow Lake, etc.), basic dye lake pigments such as C.I. Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as C.I. Pigment Yellow 153 (Nickel Nitroso Yellow, etc.), and metal complex azomethine pigments such as C.I. Pigment Yellow 117 (Copper Azomethine Yellow, etc.).

Examples of pigments exhibiting a red or magenta color include monoazo pigments such as C.I. Pigment Red 3 (Toluidine Red, etc.), disazo pigments such as C.I. Pigment Red 38 (Pyrazolone Red B, etc.), azo lake pigments such as C.I. Pigment Red 53:1 (Lake Red C, etc.) and C.I. Pigment Red 57:1 (Brilliant Carmine 6B), condensed azo pigments such as C.I. Pigment Red 144 (Azo Condensation Red BR, etc.), acidic dye lake pigments such as C.I. Pigment Red 174 (Phloxine B Lake, etc.), basic dye lake pigments such as C.I. Pigment Red 81 (Rhodamine 6G' Lake, etc.), anthraquinone pigments such as C.I. Pigment Red 177 (Dianthraquinonyl Red, etc.), thioindigo pigments such as C.I. Pigment Red 88 (Thioindigo Bordeaux, etc.), perinone pigments such as C.I. Pigment Red 194 (Perinone Red, etc.), perylene pigments such as C.I. Pigment Red 149 (Perylene Scarlet, etc.), quinacridone pigments such as C.I. Pigment violet 19 (unsubstituted quinacridone, CINQUASIA Magenta RT-355T; manufactured by Ciba Specialty Chemicals) and C.I. Pigment Red 122 (Quinacridone Magenta, etc.), isoindolinone pigments such as C.I. Pigment Red 180 (Isoindolinone Red 2BLT, etc.), and alizarin lake pigments such as C.I. Pigment Red 83 (Madder Lake, etc.).

Examples of pigments exhibiting a blue or cyan color include disazo pigments such as C.I. Pigment Blue 25 (Dianisidine Blue, etc.), phthalocyanine pigments such as C.I. Pigment Blue 15 (Phthalocyanine Blue, etc.) and C.I. Pigment Blue 15:3 (IRGALITE BLUE GLVO; manufactured by Ciba Specialty Chemicals), acidic dye lake pigments such as C.I. Pigment Blue 24 (Peacock Blue Lake, etc.), basic dye lake pigments such as C.I. Pigment Blue 1 (Victoria Pure Blue BO Lake, etc.), anthraquinone pigments such as C.I. Pigment Blue 60 (Indanthrone Blue, etc.), and alkali blue pigments such as C.I. Pigment Blue 18 (Alkali Blue V-5:1).

Examples of pigments exhibiting a green color include phthalocyanine pigments such as C.I. Pigment Green 7 (Phthalocyanine Green) and C.I. Pigment Green 36 (Phthalocyanine Green), and azo metal complex pigments such as C.I. Pigment Green 8 (Nitroso Green).

Examples of pigments exhibiting an orange color include isoindoline pigments such as C.I. Pigment Orange 66 (Isoindoline Orange) and anthraquinone pigments such as C.I. Pigment Orange 51 (Dichloropyranthrone Orange).

Examples of pigments exhibiting a black color include carbon black, titanium black, and aniline black. Examples of carbon black include SPECIAL BRACK 250 (manufactured by Degussa)

Specific examples of white pigments that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the colorant, for example, a dispersing machine such as a beads mill, a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

For dispersion of the colorant, a dispersant such as a surfactant may be added. Furthermore, when the colorant is added, as a dispersion adjuvant, it is also possible to use a synergist as necessary according to the various types of colorant. The dispersion adjuvant is preferably used at least 1 part by weight but no greater than 50 parts by weight relative to 100 parts by weight of the colorant.

In the colored ink, a solvent may be added as a dispersion medium for various components such as the colorant, or the polymerizable compound, which is a low molecular weight component, may be used as a dispersion medium without using a solvent, and since the colored ink of the present invention is preferably an actinic radiation curing type liquid and the colored ink is cured after being applied on top of a recording medium, it is preferable for it to be solvent-free. This is because, if solvent remains in the cured object formed from the cured colored ink, the solvent resistance is degraded and the VOC (Volatile Organic Compound) problem of residual solvent occurs. From this viewpoint, it is preferable to use the polymerizable compound as a dispersion medium. Among them, it is preferable to select a polymerizable compound having a low viscosity in terms of improvement of dispersion suitability and handling properties of the ink.

Since excellent coloration is achieved by finer particles, it is preferable for the average particle size of the colorant used here to be at least 0.01 μm but no greater than 0.4 μm, and more preferably at least 0.02 μm but no greater than 0.2 μm. In order to make the maximum particle size be no greater than 3 μm, and preferably no greater than 1 μm, it is preferable for the colorant, the dispersant, and the dispersion medium to be selected, and dispersion conditions and filtration conditions to be set. By such control of particle size, clogging of a head nozzle can be suppressed, and the storage stability of the colored ink, and the transparency and curing sensitivity of the colored ink can be maintained.

The particle size of the colorant in the colored ink may be measured by a known measurement method. Specifically, it may be measured by a centrifugal sedimentation light transmission method, an X-ray transmission method, a laser diffraction/scattering method, or a dynamic light scattering method. In the present invention, a value obtained by measurement using the laser diffraction/scattering method is employed.

The content of the colorant in the colored ink is not particularly limited, and may be selected appropriately according to the color and the intended application, but from the viewpoint of image density and storage stability, it is preferably 0.5 to 30 weight % relative to the weight of the entire colored ink, more preferably 1.0 to 20 weight %, and particularly preferably 2.0 to 10 weight %.

(Dispersant)

In the present invention, the ink, especially the effect pigment ink and the colored ink, preferably comprises a dispersant. Especially, when the pigment is used, the ink preferably comprises a dispersant in order to stably disperse the pigment in the ink. As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), Ionet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

As a dispersant for the effect pigment, an acidic dispersant or a basic dispersant may preferably be used, and it is more preferable to use one by selection according to an acid or base value of the surface of the effect pigment used. That is, when the surface acid value is relatively high, a basic dispersant may particularly preferably be used, and when the surface base value is relatively high an acidic dispersant may particularly preferably be used.

In the present invention, the content of the dispersant in the ink is appropriately selected according to the intended purpose, and is preferably 0.05 to 15 weight % relative to the total weight of the ink.

(Other Additives)

The ink in the present invention may comprise, in addition to the polymerizable compound, the polymerization initiator, etc., various types of additive according to the intended purpose. For example, from the viewpoint of improving the weatherability of an image that is obtained, a UV absorber may be used. Furthermore, in order to improve the storage stability, an antioxidant may be added.

Moreover, it is possible to add various types of organic and metal complex antifading agents, a conductive salt such as potassium thiocyanate, lithium nitrate, ammonium thiocyanate, or dimethylamine hydrochloride for the purpose of controlling discharge physical properties, or a trace amount of an organic solvent in order to improve the adhesion between an ink and a recording medium.

Furthermore, various types of high molecular weight compounds may be added in order to adjust coating physical properties. Examples of the high molecular weight compounds include acrylic polymers, polyvinylbutyral resins, polyurethane resins, polyamide resins, polyester resins, epoxy resins, phenolic resins, polycarbonate resins, polyvinylbutyral resins, polyvinylformal resins, shellac, vinylic resins, acrylic resins, rubber-based resins, waxes, and other natural resins. They may be used in a combination of two or more types.

In addition to the above, the composition may contain as necessary, for example, a leveling additive, a matting agent, a wax for adjusting coating physical properties, or a tackifier that does not inhibit polymerization in order to improve the adhesion to a polyolefin, PET, etc.

In accordance with the present invention, there can be provided an inkjet recording method that can give an image having an excellent metallic appearance (glitter) and excellent abrasion properties. Furthermore, there can be provided a printed material obtained by the method.

EXAMPLES

The present invention is explained in detail below by reference to examples, but the present invention should not be construed as being limited thereto.

'Parts' and '%' means 'parts by weight' and 'weight %' unless otherwise specified.

(Preparation of Aluminum Pigment Dispersion)

Liquid A described in Table 1 was stirred using a mixer manufactured by SILVERSON for 3 min. (1,000 to 1,500 rpm), thus giving a uniform preliminary dispersion. Subsequently, dispersion was carried out using a circulating bead mill (Laboratory Mini Mill) manufactured by EIGER. Dispersion conditions were such that 100 cc of zirconia beads having a diameter of 0.65 mm was charged, the peripheral speed was 9 m/s, and the dispersion time was 5 hours.

TABLE 1

|  | Liquid A (parts by weight) |
|---|---|
| Aluminum pigment solvent dispersion A | 50 |
| Acidic dispersant A | 10 |
| Isopropanol | 40 |

In Table 1, aluminum pigment solvent dispersion A and acidic dispersant A were as follows.

Aluminum pigment solvent dispersion A: 20 wt % IPA (isopropyl alcohol) dispersion of aluminum pigment, META-LURE W-52012 IL (ECKART)

Acidic dispersant A: SOLSPERSE 36000 (Luburizol)

After being dispersed, a dispersion was diluted with IPA and subjected to measurement using a laser diffraction/scattering type particle size profiler (LA-950, Horiba, Ltd.), and it was confirmed that $R_{50}=3.5$ μm. On the other hand, a sample that had been washed using ceton and dried was subjected to examination using a scanning electron microscope (JEOL6500, JEOL), and it was confirmed that $d=56$ nm.

30 g of PEA (2-phenoxyethyl acrylate, SR339C; Sartomer) was added to 100 g of dispersed liquid A and stirred using a mixer manufactured by SILVERSON for 3 min. (1,000 to 1,500 rpm), thus giving a uniform liquid. This liquid was subjected to a treatment with an evaporator, thus removing isopropanol. This treatment was carried out until the total weight of the liquid became 50 g, thus giving aluminum pigment dispersion A. The content of isopropanol in the treated aluminum pigment dispersion A was no greater than 2 wt %.

(Preparation of Metallic Ink and Transparent Ink)

A composition described in Table 2 was stirred using a mixer manufactured by SILVERSON for 15 min. (1,000 to 1,500 rpm), thus giving a uniform effect pigment ink (metallic ink). The results of measurement of surface tension are shown in Table 2.

Furthermore, a composition described in Table 3 was stirred using a mixer manufactured by SILVERSON for 10 min. (1,000 to 1,500 rpm), thus giving a uniform transparent ink. The results of measurement of surface tension are shown in Table 3.

TABLE 2

|  | Effect pigment ink (parts by weight) | | | | |
|---|---|---|---|---|---|
|  | A | B | C | D | E |
| Aluminum pigment dispersion A | 30 | 30 | 30 | 30 | 30 |
| HDDA | 20 | — | — | 20 | 20 |
| 3MPDDA | — | 20 | — | — | — |
| DPGDA | — | — | 20 | — | — |
| (PO)TMPTA | 2 | 2 | 2 | 2 | 2 |
| EOEOEA | 12 | 12 | 12 | — | — |
| PEA | — | — | — | 12 | 11.5 |
| IBOA | 3 | 3 | 3 | 3 | 3 |
| ODA | 2.8 | 2.8 | 2.8 | 2.8 | 2.8 |
| NVC | 18 | 18 | 18 | 18 | 18 |
| TPO | 4 | 4 | 4 | 4 | 4 |
| Irg819 | 4 | 4 | 4 | 4 | 4 |
| Irg184 | 2 | 2 | 2 | 2 | 2 |
| Irg907 | 1 | 1 | 1 | 1 | 1 |
| ITX | 0.5 | 0.5 | 0.5 | 0.5 | 0.5 |
| Cl-thiochromanone | 0.5 | 0.5 | 0.5 | 0.5 | 0.5 |
| Acrylicpolymer A | — | — | — | — | 0.5 |
| ST-1 | 0.2 | 0.2 | 0.2 | 0.2 | 0.2 |
| Surface tension (mN/m) | 35.4 | 35.1 | 34.3 | 36.6 | 30.3 |

TABLE 3

|  | Transparent ink (parts by weight) | | | | | | | |
|---|---|---|---|---|---|---|---|---|
|  | A | B | C | D | E | F | G | H |
| NVC | 30 | 20 | — | — | — | — | 30 | 30 |
| PEA | 30 | 23.3 | 23.3 | 23.3 | — | — | 30 | 30 |
| THFA | — | — | 20 | — | — | — | — | — |
| CTFA | 18.3 | — | — | 20 | 20 | — | 17.8 | 18.1 |
| IBOA | — | — | — | — | 23.3 | 33.3 | — | — |
| EOEOEA | — | 35 | 35 | 35 | 35 | 45 | — | — |
| TEGDA | 10 | 10 | 10 | 10 | 10 | 10 | 10 | 10 |
| TMPTA | 5 | 5 | 5 | 5 | 5 | 5 | 5 | 5 |

TABLE 3-continued

| | Transparent ink (parts by weight) | | | | | | | |
|---|---|---|---|---|---|---|---|---|
| | A | B | C | D | E | F | G | H |
| (EO)TMPTA | — | — | — | — | — | — | — | — |
| TPO | 2 | 2 | 2 | 2 | 2 | 2 | 2 | 2 |
| Irg819 | 2 | 2 | 2 | 2 | 2 | 2 | 2 | 2 |
| Irg184 | 1 | 1 | 1 | 1 | 1 | 1 | 1 | 1 |
| Irg907 | 0.5 | 0.5 | 0.5 | 0.5 | 0.5 | 0.5 | 0.5 | 0.5 |
| Cl-thiochromanone | 1 | 1 | 1 | 1 | 1 | 1 | 1 | 1 |
| M-thiochromanone | — | — | — | — | — | — | — | — |
| ST-1 | 0.2 | 0.2 | 0.2 | 0.2 | 0.2 | 0.2 | 0.2 | 0.2 |
| Acrylic polymer A | — | — | — | — | — | — | 0.5 | — |
| BYK307 | — | — | — | — | — | — | — | 0.2 |
| Surface tension (mN/m) | 37.2 | 35.1 | 34.7 | 34.5 | 33.0 | 32.2 | 30.4 | 27.2 |

The components used in Table 2 and Table 3 were as follows.

HDDA: 1,6-hexanediol diacrylate (SR238, SARTMER)

3MPDDA: 3-methyl-1,5-pentanediol diacrylate (SR341, SARTMER)

DPGDA: dipropylene glycol diacrylate (ST508, SARTMER)

(PO)TMPTA: PO-modified trimethylolpropane triacrylate (SR492, SARTMER)

EOEOEA: 2-(2-ethoxyethoxy)ethyl acrylate (SR256, SARTMER)

PEA: 2-phenoxyethyl acrylate (SR339, SARTMER)

IBOA: isobornyl acrylate (SR506, SARTMER)

ODA: octyl/decyl acrylate (SR484, SARTMER)

NVC: N-vinylcaprolactam (NVC, BASF)

THFA: tetrahydrofurfuryl acrylate (SR506, SARTMER)

CTFA: cyclic trimethylolpropane formal acrylate (SR531, SARTMER)

TEGDA: triethylene glycol diacrylate (SR268, SARTMER)

TMPTA: trimethylolpropane triacrylate (SR351, SARTMER)

(EO)TMPTA: EO-modified trimethylolpropane triacrylate (SR454, SARTMER)

TPO: LUCIRIN TPO (2,4,6-trimethylbenzoyl-diphenylphosphine oxide, BASF)

Irg819: IRGACURE 819 (bis(2,4,6-trimethylbenzoyl)phenylphosphine oxide, BASF)

Irg184: IRGACURE 184 (1-hydroxycyclohexyl phenyl ketone, BASF)

Irg907: IRGACURE 907 (2-methyl-1-(4-methylthiophenyl)-2-morpholinopropan-1-one, BASF)

ITX: mixture of 2-isopropylthioxanthone and 4-isopropylthioxanthone (Lambson, product name: SPEEDCURE ITX)

Cl-thiochromanone: compound A below

M-thiochromanone: compound B below

Acrylic polymer A: poly(2-ethylhexyl acrylate), Mw=96,000

ST-1: FIRSTCURE ST-1 (Albemarle, polymerization inhibitor)

BYK307: polyether-modified polydimethylsiloxane (BY307, BYK-Chemie)

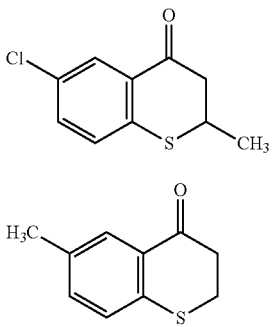

Compound A

Compound B (Image Recording Equipment (Shuttle Scanning Type))

Figure 2:
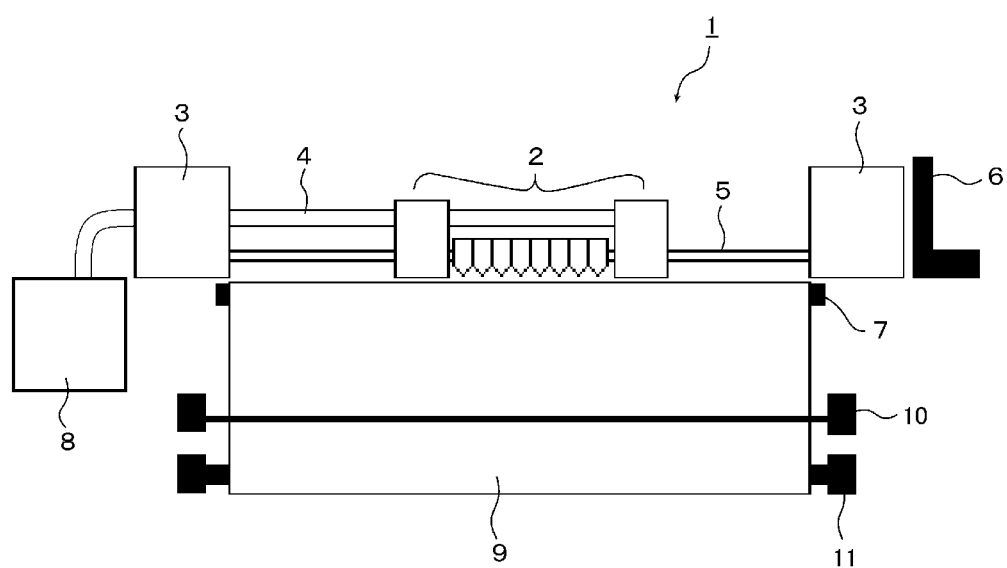
FIG. 2 A schematic diagram of the configuration of a shuttle scanning type inkjet recording printer.
Figure 3:
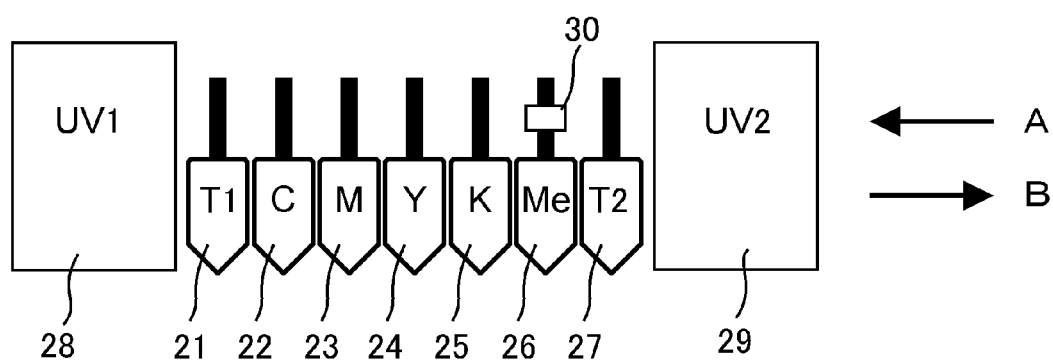
FIG. 3 A perspective view of a schematic configuration of an inkjet recording head unit.

A schematic diagram of shuttle scanning type inkjet recording printer 1 used in printing is shown in FIG. 2. FIG. 3 shows a perspective view of a schematic configuration of an inkjet recording head unit 2.

The ink was stored in an ink tank 8. The ink was supplied from the ink tank 8 to the inkjet recording head unit 2 through an ink supply tube (not illustrated).

The inkjet recording head unit 2 was fixed by means of a fixed shaft 5 formed from a long metal shaft, and reciprocated at a variable speed by means of a power section 4 that was able to reciprocate. The power section 4, which was able to reciprocate, included in its interior an ink supply tube (not illustrated) and electrical wiring for control of the head (not illustrated).

Opposite ends of the fixed shaft 5 of the inkjet recording head unit 2 were equipped with a maintenance section 3 for carrying out maintenance and cleaning of the head. Furthermore, disposed on the outside thereof were a control section 6 (e.g. a personal computer) for controlling the inkjet recording printer, and the ink tank 8.

The inkjet recording head unit 2 was formed from seven pairs of head sets in which two commercially available heads (CA4 Head, Toshiba Tec Corporation) were arranged per color to make 300 npi (21 to 27 in FIG. 3) and two commercially available UV curing type lamps (metal halide lamps) (28 and 29 in FIG. 3). The head sets were arranged in order, with inkjet heads 21 and 27 for transparent ink, an inkjet head 22 for cyan ink, an inkjet head 23 for magenta ink, an inkjet head 24 for yellow ink, an inkjet head 25 for black ink, and an inkjet head 26 for metallic ink (effect pigment ink).

The commercially available head (CA4 Head, Toshiba Tec Corporation) used as the inkjet head for the metallic ink (effect pigment ink) had removed therefrom a fitted mesh filter, and a disk filter 30 (Last Chance Filter Acro37 (LCF-23100), Pall) was installed between the head and the tank.

A recording medium suction stage 7 that was able to fix a recording medium by suction was placed immediately beneath the heads. The mechanism was such that the recording medium 9 was transported perpendicularly to reciprocation of the heads by means of a plurality of recording medium transport rollers 10 and a recording medium wind-up roller 11.

Set up was carried out by controlling head discharge frequency and head reciprocation speed so that an image was printed at a fired droplet density of 300×600 dpi per scan. Furthermore, the irradiation intensity from the metal halide lamp on the recording medium was about 1,000 mW/cm$^2$ when a slit was open and about 0 mW/cm$^2$ when the slit was closed.

(Image Recording Equipment (Single Pass Type))

Figure 4:
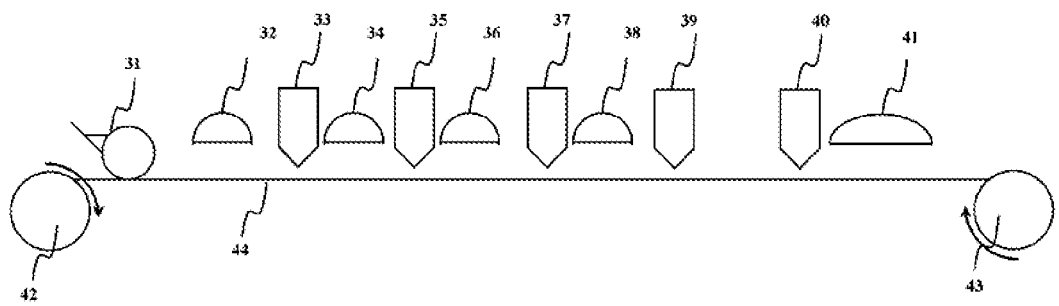
FIG. 4 A schematic diagram of the configuration of a single pass type inkjet recording printer.

A schematic diagram of a single pass type inkjet recording printer used in printing is shown in FIG. 4.

Each of inkjet recording head units 33, 35, 37, 39, and 40 was formed as a head set in which two commercially available heads (CA4 Head, Toshiba Tec Corporation) were arranged per color so as to give 600 npi as a full line. The commercially available head (CA4 Head, Toshiba Tec Corporation) used for the metallic ink inkjet head 33 had removed therefrom a fitted mesh filter, and a disk filter (Last Chance Filter Acro37 (LCF-23100), Pall) was installed between the head and the tank.

The heads were fixed to an apparatus body in the order 33 for metallic ink, 35 for cyan, 37 for magenta, 39 for yellow, and 40 for black from upstream in the recording medium transport direction, and a transparent ink roll coater 31 was placed upstream of the head 33 for the metallic ink. The structure was designed so that a recording medium 44 could move immediately underneath the heads, light sources 32, 34, 36, and 38 (365 nm UV LEDs) were placed for the respective heads in the direction of travel of the recording medium, and a metal halide lamp 41 (light intensity 3,000 mW/cm$^2$) was placed downstream of the black ink head.

Transport of the recording medium employed roll transport, and it was transported by means of a feeder 42 and a rewinder 43. A 600 dpi×600 dpi image was formed on the recording medium.

Example 1

A metallic ink inkjet head Me and transparent ink inkjet heads T1 and T2 of the shuttle scanning type inkjet recording printer 1 were charged with an ink set in a combination described in Table 4, and printing was carried out by the procedure below. As the recording medium, PET (Viewful, Kimoto) and coated paper (OK TOP COAT, Oji Paper Co., Ltd.) were used.
1) First feed scan: the head was moved in the direction of arrow A in the diagram. First, the transparent ink was applied onto the recording medium from the transparent ink inkjet head T1 at a fired droplet density of 300 dpi×1,200 dpi (the voltage and the number of pulses were adjusted so that the amount discharged from one nozzle was 42 pL). Subsequently, the metallic ink was applied onto the recording medium from the metallic ink inkjet head Me at a fired droplet density of 300 dpi×1,200 dpi (the voltage and the number of pulses were adjusted so that the amount discharged from one nozzle was 42 pL). Immediately after that, the recording medium was irradiated with UV using UV irradiation lamp UV2.

The position and the angle of nozzles in the sub scanning direction and the discharge time were adjusted so that the centers of dots from the inkjet head T1 and the centers of dots from the inkjet head Me coincided with each other.
2) First return scan: the head was moved in the direction of arrow B in the diagram. First, the transparent ink was applied onto the recording medium from the transparent ink inkjet head T2 at a fired droplet density of 300 dpi×1,200 dpi (the voltage and the number of pulses were adjusted so that the amount discharged from one nozzle was 42 pL). Subsequently, the metallic ink was applied onto the recording medium from the metallic ink inkjet head Me at a fired droplet density of 300 dpi×1,200 dpi (the voltage and the number of pulses were adjusted so that the amount discharged from one nozzle was 42 pL). Immediately after that, the recording medium was irradiated with UV using UV irradiation lamp UV1.

The position and the angle of nozzles in the sub scanning direction and the discharge time were adjusted so that the centers of dots from the inkjet head T2 and the centers of dots from the inkjet head Me coincided with each other.
3) Feeding of recording medium: the recording medium was fed by only 43.6 mm, which was 10 mm less than the head width (53.6 mm).
4) Procedures 1) to 3) above were repeated to produce a printed material having an area of about 30 cm×about 30 cm.
5) After printing, metallic appearance, coverage, and abrasion properties were evaluated using the evaluation criteria below.
(Metallic Appearance)

The presence or absence of a metallic appearance can be expressed by measuring surface gloss at 20 degrees, 60 degrees, and 85 degrees. The surface gloss was measured using a surface gloss meter (Tri-Glossmaster u, Sheen).
Good: gloss value (60 degrees)>gloss value (20 degrees) >gloss value (85 degrees) and gloss value (60 degrees)>80 were satisfied.
Fair: gloss value (60 degrees)>gloss value (20 degrees)>gloss value (85 degrees) and gloss value (60 degrees)>60 were satisfied.
Poor: the above were not satisfied.
(Coverage)

Overlap between dots was examined and evaluated visually using a transmission microscope; when dots of the metallic ink (the effect pigment ink) overlapped each other and leakage of light could not be observed, it was evaluated as 'complete coverage', and when leakage of light could be observed it was evaluated as 'gaps present'. In this case, complete coverage was preferable.
(Abrasion Properties)

The surface was rubbed for 10 back-and-forth traverses using a Kimwipe; when the surface did not come off it was evaluated as Good, and when it came off it was evaluated as Poor.

TABLE 4

| Ink set | Effect pigment ink | | Transparent ink | | PET | | | Coated paper | | |
|---|---|---|---|---|---|---|---|---|---|---|
| | Type | Surface tension (mN/m) | Type | Surface tension (mN/m) | Metallic appearance | Coverage | Abrasion properties | Metallic appearance | Coverage | Abrasion properties |
| 1 | A | 35.4 | A | 37.2 | Good | Complete coverage | Good | Good | Complete coverage | Good |
| 2 | | | B | 35.1 | Fair | Gaps present | Good | Fair | Gaps present | Good |
| 3 | | | C | 34.7 | Fair | Gaps present | Good | Fair | Gaps present | Good |
| 4 | | | D | 34.5 | Fair | Gaps present | Good | Fair | Gaps present | Good |
| 5 | | | E | 33.0 | Fair | Gaps present | Good | Fair | Gaps present | Good |
| 6 | | | F | 32.2 | Fair | Gaps present | Good | Fair | Gaps present | Good |

TABLE 4-continued

| Ink set | Effect pigment ink Type | Effect pigment ink Surface tension (mN/m) | Transparent ink Type | Transparent ink Surface tension (mN/m) | PET Metallic appearance | PET Coverage | PET Abrasion properties | Coated paper Metallic appearance | Coated paper Coverage | Coated paper Abrasion properties |
|---|---|---|---|---|---|---|---|---|---|---|
| 7 | | | G | 30.4 | Fair | Gaps present | Good | Fair | Gaps present | Good |
| 8 | | | H | 27.2 | Fair | Gaps present | Good | Fair | Gaps present | Good |
| 9 | B | 35.1 | A | 37.2 | Good | Complete coverage | Good | Good | Complete coverage | Good |
| 10 | | | B | 35.1 | Fair | Gaps present | Good | Fair | Gaps present | Good |
| 11 | | | C | 34.7 | Fair | Gaps present | Good | Fair | Gaps present | Good |
| 12 | | | D | 34.5 | Fair | Gaps present | Good | Fair | Gaps present | Good |
| 13 | | | E | 33.0 | Fair | Gaps present | Good | Fair | Gaps present | Good |
| 14 | | | F | 32.2 | Fair | Gaps present | Good | Fair | Gaps present | Good |
| 15 | | | G | 30.4 | Fair | Gaps present | Good | Fair | Gaps present | Good |
| 16 | | | H | 27.2 | Fair | Gaps present | Good | Fair | Gaps present | Good |
| 17 | C | 34.3 | A | 37.2 | Good | Complete coverage | Good | Good | Complete coverage | Good |
| 18 | | | B | 35.1 | Good | Complete coverage | Good | Good | Complete coverage | Good |
| 19 | | | C | 34.7 | Good | Complete coverage | Good | Good | Complete coverage | Good |
| 20 | | | D | 34.5 | Good | Complete coverage | Good | Good | Complete coverage | Good |
| 21 | | | E | 33.0 | Fair | Gaps present | Good | Fair | Gaps present | Good |
| 22 | | | F | 32.2 | Fair | Gaps present | Good | Fair | Gaps present | Good |
| 23 | | | G | 30.4 | Fair | Gaps present | Good | Fair | Gaps present | Good |
| 24 | | | H | 27.2 | Fair | Gaps present | Good | Fair | Gaps present | Good |
| 25 | D | 36.6 | A | 37.2 | Good | Complete coverage | Good | Good | Complete coverage | Good |
| 26 | | | B | 35.1 | Fair | Gaps present | Good | Fair | Gaps present | Good |
| 27 | | | C | 34.7 | Fair | Gaps present | Good | Fair | Gaps present | Good |
| 28 | | | D | 34.5 | Fair | Gaps present | Good | Fair | Gaps present | Good |
| 29 | | | E | 33.0 | Fair | Gaps present | Good | Fair | Gaps present | Good |
| 30 | | | F | 32.2 | Fair | Gaps present | Good | Fair | Gaps present | Good |
| 31 | | | G | 30.4 | Fair | Gaps present | Good | Fair | Gaps present | Good |
| 32 | | | H | 27.2 | Fair | Gaps present | Good | Fair | Gaps present | Good |
| 33 | E | 30.3 | A | 37.2 | Good | Complete coverage | Good | Good | Complete coverage | Good |
| 34 | | | B | 35.1 | Good | Complete coverage | Good | Good | Complete coverage | Good |
| 35 | | | C | 34.7 | Good | Complete coverage | Good | Good | Complete coverage | Good |
| 36 | | | D | 34.5 | Good | Complete coverage | Good | Good | Complete coverage | Good |
| 37 | | | E | 33.0 | Good | Complete coverage | Good | Good | Complete coverage | Good |
| 38 | | | F | 32.2 | Good | Complete coverage | Good | Good | Complete coverage | Good |
| 39 | | | G | 30.4 | Good | Complete coverage | Good | Good | Complete coverage | Good |
| 40 | | | H | 27.2 | Fair | Gaps present | Good | Fair | Gaps present | Good |

Comparative Example 1

The metallic ink inkjet head Me of the shuttle scanning type inkjet recording printer 1 was charged with metallic ink A, and printing was carried out by the procedure below. As the recording medium, PET (Viewful, Kimoto) was used.
1) First feed scan: the head was moved in the direction of arrow A in the diagram. First, the metallic ink was applied onto the recording medium from the metallic ink inkjet head Me at a fired droplet density of 300 dpi×1,200 dpi (the voltage and the number of pulses were adjusted so that the amount discharged from one nozzle was 42 pL).

Immediately after that, the recording medium was irradiated with UV using UV irradiation lamp UV2.
2) First return scan: the head was moved in the direction of arrow B in the diagram. The metallic ink was applied onto the recording medium from the metallic ink inkjet head Me at a fired droplet density of 300 dpi×1,200 dpi (the voltage and the number of pulses were adjusted so that the amount discharged from one nozzle was 42 pL). Immediately after that, the recording medium was irradiated with UV using UV irradiation lamp UV1.
3) Feeding of recording medium: the recording medium was fed by only 43.6 mm, which was 10 mm less than the head width (53.6 mm).
4) Procedures 1) to 3) above were repeated to produce a printed material having an area of about 30 cm×about 30 cm.
5) After printing, metallic appearance, coverage, and abrasion properties were evaluated using the evaluation criteria above.

Comparative Example 2

The metallic ink inkjet head Me of the shuttle scanning type inkjet recording printer 1 was charged with metallic ink A, and printing was carried out by the procedure below. As the recording medium, PET (Viewful, Kimoto) was used.

1) Before starting printing, a printing section of the recording medium was bar-coated (6 µm) with transparent ink A and completely cured by irradiation with UV.
2) First feed scan: the head was moved in the direction of arrow A in the diagram. First, the metallic ink was applied onto the recording medium from the metallic ink inkjet head Me at a fired droplet density of 300 dpi×1,200 dpi (the voltage and the number of pulses were adjusted so that the amount discharged from one nozzle was 42 pL).

Immediately after that, the recording medium was irradiated with UV using UV irradiation lamp UV2.
3) First return scan: the head was moved in the direction of arrow B in the diagram. The metallic ink was applied onto the recording medium from the metallic ink inkjet head Me at a fired droplet density of 300 dpi×1,200 dpi (the voltage and the number of pulses were adjusted so that the amount discharged from one nozzle was 42 pL). Immediately after that, the recording medium was irradiated with UV using UV irradiation lamp UV1.
4) Feeding of recording medium: the recording medium was fed by only 43.6 mm, which was 10 mm less than the head width (53.6 mm).
5) Procedures 1) to 4) above were repeated to produce a printed material having an area of about 30 cm×about 30 cm.
6) After printing, metallic appearance, coverage, and abrasion properties were evaluated using the evaluation criteria above.

Example 2

The shuttle scanning type printer 1 was charged with metallic ink A and transparent ink A, and printing was carried out by the procedure below. As the recording medium, PET (Viewful, Kimoto) was used.
1) First feed scan: the head was moved in the direction of arrow A in the diagram. First, the transparent ink A was applied onto the recording medium from the transparent ink inkjet head T1 at a fired droplet density of 300 dpi×1,200 dpi (the voltage and the number of pulses were adjusted so that the amount discharged from one nozzle was 42 pL). Immediately after that, the recording medium was irradiated with UV using UV irradiation lamp UV2. The opened width of the slit was set narrow so that the percentage cure at this time was 80% to 85%.
2) First return scan: the head was moved in the direction of arrow B in the diagram. The metallic ink A was applied onto the recording medium from the metallic ink inkjet head Me at a fired droplet density of 300 dpi×1,200 dpi (the voltage and the number of pulses were adjusted so that the amount discharged from one nozzle was 42 pL).

The position and the angle of nozzles in the sub scanning direction and the discharge time were adjusted so that the centers of dots from the inkjet head T1 and the centers of dots from the inkjet head Me coincided with each other. Immediately after that, the recording medium was irradiated with UV using UV irradiation lamp UV2. The opened width of the slit was set wide so that the percentage cure at this time was at least 90%.
3) Second feed scan: the head was moved in the direction of arrow A in the diagram. The transparent ink A was applied onto the recording medium from the transparent ink inkjet head T1 at a fired droplet density of 300 dpi×1,200 dpi (the voltage and the number of pulses were adjusted so that the amount discharged from one nozzle was 42 pL). Immediately after that, the recording medium was irradiated with UV using UV irradiation lamp UV2. The opened width of the slit was set narrow so that the percentage cure at this time was 80% to 85%.
4) Second return scan: the head was moved in the direction of arrow B in the diagram. The metallic ink A was applied onto the recording medium from the metallic ink inkjet head Me at a fired droplet density of 300 dpi×1,200 dpi (the voltage and the number of pulses were adjusted so that the amount discharged from one nozzle was 42 pL).

The position and the angle of nozzles in the sub scanning direction and the discharge time were adjusted so that the centers of dots from the inkjet head T1 and the centers of dots from the inkjet head Me coincided with each other. Immediately after that, the recording medium was irradiated with UV using UV irradiation lamp UV2. The opened width of the slit was set wide so that the percentage cure at this time was at least 90%.
5) Feeding of recording medium: the recording medium was fed by only 43.6 mm, which was 10 mm less than the head width (53.6 mm).
6) Procedures 1) to 5) above were repeated to produce a printed material having an area of about 30 cm×about 30 cm.
7) After printing, metallic appearance, coverage, and abrasion properties were evaluated. The results are given below.

Example 3

A printed material was produced in the same manner as in Example 2 except that the percentage cure of the transparent ink in 1) and 3) of Example 2 above was changed to 55%, and evaluation of metallic appearance, coverage, and abrasion properties was carried out. The results are shown in the Table below.

Example 4

The single pass type printer shown in FIG. 4 was charged with metallic ink A and transparent ink A, and printing was carried out by the procedure below. As the recording medium, PET (Viewful, Kimoto) was used.
1) The recording medium was transported by rotation of the feeder 42 and the rewinder 43 in the direction of the arrows in FIG. 4. First, a 6 µm thick transparent ink layer was formed above the recording medium using the transparent ink roll coater 31.
2) The metallic ink A was applied onto the recording medium from the metallic ink inkjet head 33 at a fired droplet density of 600 dpi×1,200 dpi (the voltage and the number of pulses were adjusted so that the amount discharged from one nozzle was 21 pL).
3) The metallic ink/transparent ink layer were cured by irradiation with the metal halide lamp 41.
4) A printed material having an area of about 10 cm×30 cm was formed by the procedure above.
5) After printing, metallic appearance, coverage, and abrasion properties were evaluated. The results are given below.

Example 5

The single pass type printer shown in FIG. 4 was charged with metallic ink A and transparent ink A, and printing was carried out by the procedure below. As the recording medium, PET (Viewful, Kimoto) was used.
1) The recording medium was transported by rotation of the feeder 42 and the rewinder 43 in the direction of the arrows in FIG. 4. First, a 6 µm thick transparent ink layer was formed above the recording medium using the transparent ink roll coater 31.

2) The transparent ink was irradiated with UV using the light source 32 (UV LED). The output of the LED was adjusted so that the percentage cure was 80% to 85%.
3) The metallic ink A was applied onto the recording medium from the metallic ink inkjet head 33 at a fired droplet density of 600 dpi×1,200 dpi (the voltage and the number of pulses were adjusted so that the amount discharged from one nozzle was 21 pL).
4) The metallic ink/transparent ink layer were cured by irradiation with the metal halide lamp 41.
5) A printed material having an area of about 10 cm×30 cm was formed by the procedure above.
6) After printing, metallic appearance, coverage, and abrasion properties were evaluated. The results are given below.

Comparative Example 3

The single pass type printer shown in FIG. 4 was charged with metallic ink A and transparent ink A, and printing was carried out by the procedure below. As the recording medium, PET (Viewful, Kimoto) was used.
1) The recording medium was transported by rotation of the feeder 42 and the rewinder 43 in the direction of the arrows in FIG. 4. First, a 6 μm thick transparent ink layer was formed above the recording medium using the transparent ink roll coater 31.
2) The transparent ink was irradiated with UV using the light source 32 (UV LED). The output of the LED was adjusted so that the percentage cure was more than 85%.
3) The metallic ink A was applied onto the recording medium from the metallic ink inkjet head 33 at a fired droplet density of 600 dpi×1,200 dpi (the voltage and the number of pulses were adjusted so that the amount discharged from one nozzle was 21 pL).
4) The metallic ink/transparent ink layer were cured by irradiation with the metal halide lamp 41.
5) A printed material having an area of about 10 cm×30 cm was formed by the procedure above.
6) After printing, metallic appearance, coverage, and abrasion properties were evaluated. The results are given below.

Example 6

Figure 5:
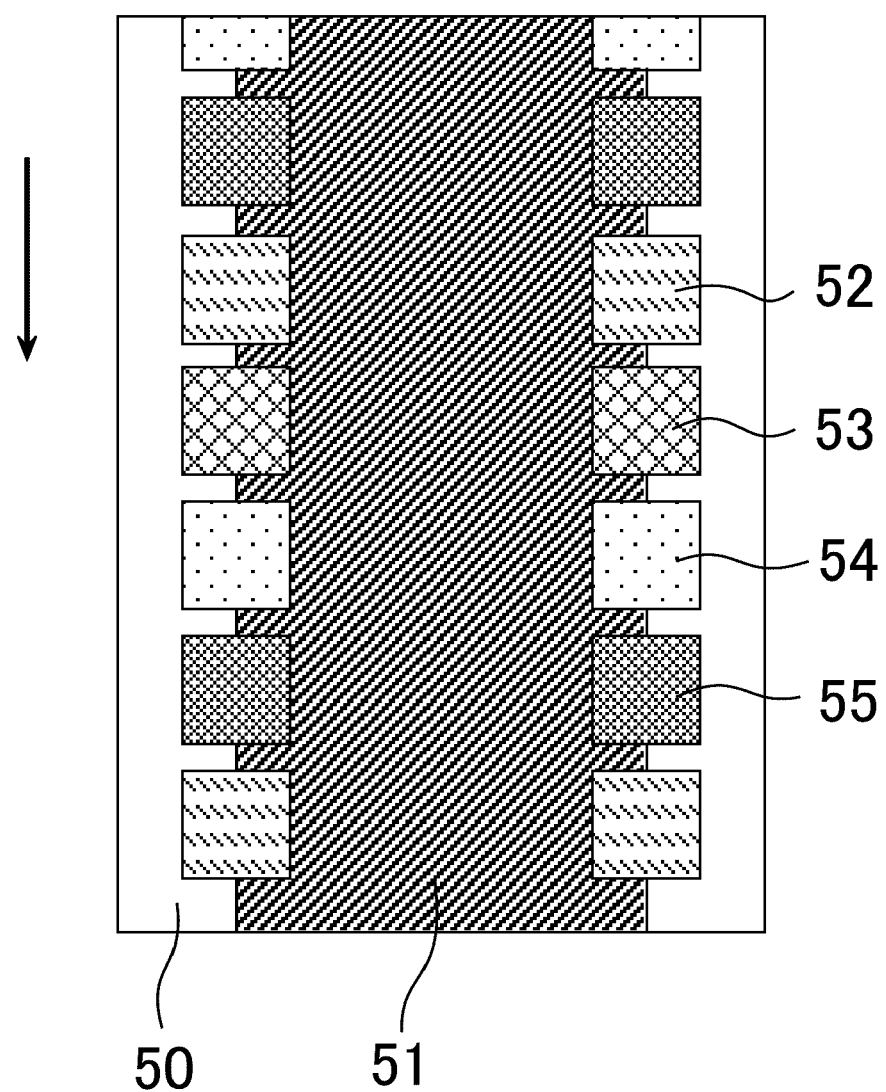
FIG. 5 A conceptual diagram of an image formed in Example 1-5.

The single pass type printer shown in FIG. 4 was charged with metallic ink A and transparent ink A, and printing was carried out by the procedure below. As the recording medium, PET (Viewful, Kimoto) was used. As color inks, cyan KO215, magenta KO867, yellow KI052, and black KI004 of the UVJet series manufactured by FUJIFILM Specialty Ink Systems were used.
1) The recording medium was transported by rotation of the feeder 42 and the rewinder 43 in the direction of the arrows in FIG. 4. First, a 6 μm thick transparent ink layer was formed above the recording medium using the transparent ink roll coater 31.
2) The transparent ink was irradiated with UV using the light source 32 (UV LED). The output of the LED was adjusted so that the percentage cure was 80% to 85%.
3) The metallic ink A was applied onto the recording medium from the metallic ink inkjet head 33 at a fired droplet density of 600 dpi×1,200 dpi (the voltage and the number of pulses were adjusted so that the amount discharged from one nozzle was 21 pL).
The printing width of the metallic ink was 6 cm, and the printing length was 1 m without discontinuities (metallic ink image 51 in FIG. 5).
4) The metallic ink was irradiated with UV using the light source 34 (UV LED). The output of the LED was adjusted so that the percentage cure of the metallic ink was no greater than 80%.
5) The cyan ink was applied onto the recording medium from the cyan ink inkjet head 35 at a fired droplet density of 600 dpi×1,200 dpi (cyan ink image 52 in FIG. 5) (the voltage and the number of pulses were adjusted so that the amount discharged from one nozzle was 21 pL).
The printing width was 2 cm, with opposite edges of the metallic ink being overlapped by 1 cm. The printing length was 2 cm (FIG. 5).
6) Irradiation with UV was carried out using the light source 36 (UV LED). The output of the LED was adjusted so that the percentage cure of the cyan ink was no greater than 80%.
7) The magenta ink was applied onto the recording medium from the magenta ink inkjet head 37 at a fired droplet density of 600 dpi×1,200 dpi (magenta image 53 in FIG. 5) (the voltage and the number of pulses were adjusted so that the amount discharged from one nozzle was 21 pL). The printing width was 2 cm, with opposite edges of the metallic ink being overlapped by 1 cm. The printing width was 2 cm, with opposite edges of the metallic ink being overlapped by 1 cm. The printing length was 2 cm and there was no overlap with the cyan printed area (FIG. 5).
8) Irradiation with UV was carried out using the light source 38 (UV LED). The output of the LED was adjusted so that the percentage cure of the magenta ink was no greater than 80%.
9) The yellow ink was applied onto the recording medium from the yellow ink inkjet head 39 at a fired droplet density of 600 dpi×1,200 dpi (the voltage and the number of pulses were adjusted so that the amount discharged from one nozzle was 21 pL). The printing width was 2 cm, with opposite edges of the metallic ink being overlapped by 1 cm. The printing width was 2 cm, with opposite edges of the metallic ink being overlapped by 1 cm. The printing length was 2 cm and there was no overlap with the cyan or magenta printed areas (yellow ink image 54 in FIG. 5).
10) The black ink was applied onto the recording medium from the black ink inkjet head 40 at a fired droplet density of 600 dpi×1,200 dpi (the voltage and the number of pulses were adjusted so that the amount discharged from one nozzle was 21 pL). The printing width was 2 cm, with opposite edges of the metallic ink being overlapped by 1 cm. The printing width was 2 cm, with opposite edges of the metallic ink being overlapped by 1 cm. The printing length was 2 cm and there was no overlap with the cyan, magenta, or yellow printed areas (black ink image 55 in FIG. 5).
11) The metallic ink/colored ink/transparent ink layer were cured by irradiation with the metal halide lamp 41.
12) A printed material having an area of about 6 cm×100 cm was formed by the procedure above.
13) After printing, metallic appearance, coverage, and abrasion properties were evaluated. The results are given below.

TABLE 5

|  | Metallic appearance | Coverage | Abrasion properties | Notes |
| --- | --- | --- | --- | --- |
| Comp. Ex. 1 | Poor | Complete coverage | Good | Metallic ink only |
| Comp. Ex. 2 | Poor | Complete coverage | Good | Transparent ink completely cured |
| Ex. 2 | Fair | Complete coverage | Good | Transparent ink percentage cure 80-85% |
| Ex. 3 | Good | Complete | Good | Transparent ink |

TABLE 5-continued

|  | Metallic appearance | Coverage | Abrasion properties | Notes |
|---|---|---|---|---|
|  |  | coverage |  | percentage cure 55% |
| Ex. 4 | Good | Complete coverage | Good | Single pass method |
| Ex. 5 | Fair | Complete coverage | Good | Single pass method Transparent ink percentage cure 80-85% |
| Comp. Ex. 3 | Poor | Complete coverage | Good | Single pass Transparent ink percentage cure greater than 85% |
| Ex. 6 | Good | Complete coverage | Good | Colored ink used |

Example 1'

The metallic ink inkjet head Me and transparent ink inkjet heads T1 and T2 of the shuttle scanning type inkjet recording printer 1 were charged with ink sets in a combination described in Table 6, and printing was carried out by the procedure below. As the recording medium, PET (Viewful, Kimoto) and coated paper (OK TOP COAT, Oji Paper Co., Ltd.) were used.

1) First feed scan: the head was moved in the direction of arrow A in the diagram. First, the metallic ink was discharged onto the recording medium from the metallic ink inkjet head Me at a fired droplet density of 300 dpi×1,200 dpi (the voltage and the number of pulses were adjusted so that the amount discharged from one nozzle was 42 pL). Subsequently, the transparent ink was discharged onto the recording medium from a transparent ink inkjet head T2 at a fired droplet density of 300 dpi×1,200 dpi (the voltage and the number of pulses were adjusted so that the amount discharged from one nozzle was 42 pL).

Immediately after that, the recording medium was irradiated with UV using UV irradiation lamp UV2.

The position and the angle of nozzles in the sub scanning direction and the discharge time were adjusted so that the centers of dots from the inkjet head Me and the centers of dots from the inkjet head T2 coincided with each other.

2) First return scan: the head was moved in the direction of arrow B in the diagram. The metallic ink was discharged onto the recording medium from the metallic ink inkjet head Me at a fired droplet density of 300 dpi×1,200 dpi (the voltage and the number of pulses were adjusted so that the amount discharged from one nozzle was 42 pL). Subsequently, the transparent ink was discharged onto the recording medium from the transparent ink inkjet head T1 at a fired droplet density of 300 dpi×1,200 dpi (the voltage and the number of pulses were adjusted so that the amount discharged from one nozzle was 42 pL). Immediately after that, the recording medium was irradiated with UV using UV irradiation lamp UV1.

The position and the angle of nozzles in the sub scanning direction and the discharge time were adjusted so that the centers of dots from the inkjet head T1 and the centers of dots from the inkjet head Me coincided with each other.

3) Feeding of recording medium: the recording medium was fed by only 43.6 mm, which was 10 mm less than the head width (53.6 mm).

4) Procedures 1) to 3) above were repeated to produce a printed material having an area of about 30 cm×about 30 cm.

5) After printing, metallic appearance, coverage, and abrasion properties were evaluated using the evaluation criteria above.

(Metallic Appearance)

The presence or absence of a metallic appearance can be expressed by measuring surface gloss at 20 degrees, 60 degrees, and 85 degrees (surface gloss meter: Tri-Glossmaster u, Sheen).

Excellent: gloss value (60 degrees)>gloss value (20 degrees) >gloss value (85 degrees) and gloss value (60 degrees)>100 were satisfied.

Good: gloss value (60 degrees)>gloss value (20 degrees) >gloss value (85 degrees) and gloss value (60 degrees)>80 were satisfied.

Fair: gloss value (60 degrees)>gloss value (20 degrees)>gloss value (85 degrees) and gloss value (60 degrees)>80 were satisfied.

Poor: the above were not satisfied.

(Uniformity)

Whether or not the area that gave a metallic appearance was uniform was examined by eye and evaluated. In this case, being uniform was preferable.

(Abrasion Properties)

The surface was rubbed for 10 back-and-forth traverses using a Kimwipe; when the surface did not come off it was evaluated as Good, and when it came off it was evaluated as Poor.

TABLE 6

| | Effect pigment ink (metallic ink) | | Transparent ink | | PET | | | Coated paper | | |
|---|---|---|---|---|---|---|---|---|---|---|
| Ink set | Type | Surface tension (mN/m) | Type | Surface tension (mN/m) | Metallic appearance | Uniformity | Abrasion properties | Metallic appearance | Uniformity | Abrasion properties |
| 1' | A | 35.4 | A | 37.2 | Good | Non-uniform | Good | Excellent | Uniform | Good |
| 2' |  |  | B | 35.1 | Excellent | Uniform | Good | Excellent | Uniform | Good |
| 3' |  |  | C | 34.7 | Excellent | Uniform | Good | Excellent | Uniform | Good |
| 4' |  |  | D | 34.5 | Excellent | Uniform | Good | Excellent | Uniform | Good |
| 5' |  |  | E | 33.0 | Excellent | Uniform | Good | Excellent | Uniform | Good |
| 6' |  |  | F | 32.2 | Excellent | Uniform | Good | Excellent | Uniform | Good |
| 7' |  |  | G | 30.4 | Excellent | Uniform | Good | Excellent | Uniform | Good |
| 8' |  |  | H | 27.2 | Fair | Uniform | Good | Fair | Uniform | Good |
| 9' | B | 35.1 | A | 37.2 | Good | Non-uniform | Good | Excellent | Uniform | Good |
| 10' |  |  | B | 35.1 | Excellent | Uniform | Good | Excellent | Uniform | Good |
| 11' |  |  | C | 34.7 | Excellent | Uniform | Good | Excellent | Uniform | Good |
| 12' |  |  | D | 34.5 | Excellent | Uniform | Good | Excellent | Uniform | Good |

TABLE 6-continued

| | Effect pigment ink (metallic ink) | | Transparent ink | | PET | | | Coated paper | | |
|---|---|---|---|---|---|---|---|---|---|---|
| Ink set | Type | Surface tension (mN/m) | Type | Surface tension (mN/m) | Metallic appearance | Uniformity | Abrasion properties | Metallic appearance | Uniformity | Abrasion properties |
| 13' | | | E | 33.0 | Excellent | Uniform | Good | Excellent | Uniform | Good |
| 14' | | | F | 32.2 | Excellent | Uniform | Good | Excellent | Uniform | Good |
| 15' | | | G | 30.4 | Excellent | Uniform | Good | Excellent | Uniform | Good |
| 16' | | | H | 27.2 | Fair | Uniform | Good | Fair | Uniform | Good |
| 17' | C | 34.3 | A | 37.2 | Good | Non-uniform | Good | Excellent | Uniform | Good |
| 18' | | | B | 35.1 | Good | Non-uniform | Good | Excellent | Uniform | Good |
| 19' | | | C | 34.7 | Good | Non-uniform | Good | Excellent | Uniform | Good |
| 20' | | | D | 34.5 | Good | Non-uniform | Good | Excellent | Uniform | Good |
| 21' | | | E | 33.0 | Excellent | Uniform | Good | Excellent | Uniform | Good |
| 22' | | | F | 32.2 | Excellent | Uniform | Good | Excellent | Uniform | Good |
| 23' | | | G | 30.4 | Excellent | Uniform | Good | Excellent | Uniform | Good |
| 24' | | | H | 27.2 | Fair | Uniform | Good | Fair | Uniform | Good |
| 25' | D | 36.6 | A | 37.2 | Good | Non-uniform | Good | Excellent | Uniform | Good |
| 26' | | | B | 35.1 | Excellent | Uniform | Good | Excellent | Uniform | Good |
| 27' | | | C | 34.7 | Excellent | Uniform | Good | Excellent | Uniform | Good |
| 28' | | | D | 34.5 | Excellent | Uniform | Good | Excellent | Uniform | Good |
| 29' | | | E | 33.0 | Excellent | Uniform | Good | Excellent | Uniform | Good |
| 30' | | | F | 32.2 | Excellent | Uniform | Good | Excellent | Uniform | Good |
| 31' | | | G | 30.4 | Excellent | Uniform | Good | Excellent | Uniform | Good |
| 32' | | | H | 27.2 | Fair | Uniform | Good | Fair | Uniform | Good |
| 33' | E | 30.3 | A | 37.2 | Good | Non-uniform | Good | Excellent | Uniform | Good |
| 34' | | | B | 35.1 | Good | Non-uniform | Good | Excellent | Uniform | Good |
| 35' | | | C | 34.7 | Good | Non-uniform | Good | Excellent | Uniform | Good |
| 36' | | | D | 34.5 | Good | Non-uniform | Good | Excellent | Uniform | Good |
| 37' | | | E | 33.0 | Good | Non-uniform | Good | Excellent | Uniform | Good |
| 38' | | | F | 32.2 | Good | Non-uniform | Good | Excellent | Uniform | Good |
| 39' | | | G | 30.4 | Good | Non-uniform | Good | Excellent | Uniform | Good |
| 40' | | | H | 27.2 | Fair | Uniform | Good | Fair | Uniform | Good |

Comparative Example 1'

The metallic ink inkjet head Me of the shuttle scanning type inkjet recording printer 1 was charged with metallic ink D, and printing was carried out by the procedure below. As the recording medium, PET (Viewful, Kimoto) and coated paper (OK TOP COAT, Oji Paper Co., Ltd.) were used.

1) First feed scan: the head was moved in the direction of arrow A in FIG. 3. First, the metallic ink was discharged onto the recording medium from the metallic ink inkjet head Me at a fired droplet density of 300 dpi×1,200 dpi (the voltage and the number of pulses were adjusted so that the amount discharged from one nozzle was 42 pL).

Immediately after that, the recording medium was irradiated with UV using UV irradiation lamp UV2.

2) First return scan: the head was moved in the direction of arrow B in FIG. 3. The metallic was discharged onto the recording medium from the metallic ink inkjet head Me at a fired droplet density of 300 dpi×1,200 dpi (the voltage and the number of pulses were adjusted so that the amount discharged from one nozzle was 42 pL). Immediately after that, the recording medium was irradiated with UV using UV irradiation lamp UV1.

3) Feeding of recording medium: the recording medium was fed by only 43.6 mm, which was 10 mm less than the head width (53.6 mm).

4) Procedures 1) to 3) above were repeated to produce a printed material having an area of about 30 cm×about 30 cm.

5) After printing, metallic appearance, uniformity, and abrasion properties were evaluated using the evaluation criteria above.

Comparative Example 2'

The shuttle scanning type inkjet recording printer 1 was charged with metallic ink D and transparent ink F, and printing was carried out by the procedure below. As the recording medium, PET (Viewful, Kimoto) was used.

1) First feed scan: the head was moved in the direction of arrow A in FIG. 3. First, the metallic D was discharged onto the recording medium from the metallic ink inkjet head Me at a fired droplet density of 300 dpi×1,200 dpi (the voltage and the number of pulses were adjusted so that the amount discharged from one nozzle was 42 pL). The recording medium was irradiated with UV using UV irradiation lamp UV2. The opened width of the slit was set so that the percentage cure at this time was greater than 85%.

2) First return scan: the head was moved in the direction of arrow B in FIG. 3. The transparent ink F was discharged onto the recording medium from the transparent ink inkjet head T1 at a fired droplet density of 300 dpi×1,200 dpi (the voltage and the number of pulses were adjusted so that the amount discharged from one nozzle was 42 pL). The position and the angle of nozzles in the sub scanning direction and the discharge time were adjusted so that the centers of dots from the inkjet head T1 and the centers of dots from the inkjet head Me coincided with each other. Immediately after that, the recording medium was irradiated with UV using UV irradiation lamp UV2. The opened width of the slit was set wide so that the percentage cure at this time was at least 90%.

3) Second feed scan: the head was moved in the direction of arrow A in FIG. 3. The metallic ink D was discharged onto the recording medium from the metallic ink inkjet head Me at a fired droplet density of 300 dpi×1,200 dpi (the voltage and the number of pulses were adjusted so that the amount discharged from one nozzle was 42 pL). The recording medium was irradiated with UV using UV irradiation lamp UV2. The opened width of the slit was set so that the percentage cure at this time was greater than 85%.

4) Second return scan: the head was moved in the direction of arrow B in FIG. 3. The transparent ink F was discharged onto the recording medium from the transparent ink inkjet head T1 at a fired droplet density of 300 dpi×1,200 dpi (the voltage and the number of pulses were adjusted so that the amount discharged from one nozzle was 42 pL). The position and the angle of nozzles in the sub scanning direction and the discharge time were adjusted so that the centers of dots from the inkjet head T1 and the centers of dots from the inkjet head Me coincided with each other. Immediately after that, the recording medium was irradiated with UV using UV irradiation lamp UV2. The opened width of the slit was set wide so that the percentage cure at this time was at least 90%.

5) Feeding of recording medium: the recording medium was fed by only 43.6 mm, which was 10 mm less than the head width (53.6 mm).

6) Procedures 1) to 5) above were repeated to produce a printed material having an area of about 30 cm×about 30 cm.

7) After printing, metallic appearance, uniformity, and abrasion properties were evaluated using the evaluation criteria above.

Example 2'

The shuttle scanning type inkjet recording printer 1 was charged with metallic ink D and transparent ink F, and printing was carried out by the procedure below. As the recording medium, PET (Viewful, Kimoto) was used.

1) First feed scan: the head was moved in the direction of arrow A in FIG. 3. First, the metallic ink D was discharged onto the recording medium from the metallic ink inkjet head Me at a fired droplet density of 300 dpi×1,200 dpi (the voltage and the number of pulses were adjusted so that the amount discharged from one nozzle was 42 pL). The recording medium was irradiated with UV using UV irradiation lamp UV2. The opened width of the slit was set narrow so that the percentage cure at this time was 80% to 85%.

2) First return scan: the head was moved in the direction of arrow B in FIG. 3. The transparent ink F was discharged onto the recording medium from the transparent ink inkjet head T1 at a fired droplet density of 300 dpi×1,200 dpi (the voltage and the number of pulses were adjusted so that the amount discharged from one nozzle was 42 pL). The position and the angle of nozzles in the sub scanning direction and the discharge time were adjusted so that the centers of dots from the inkjet head T1 and the centers of dots from the inkjet head Me coincided with each other. Immediately after that, the recording medium was irradiated with UV using UV irradiation lamp UV2. The opened width of the slit was set wide so that the percentage cure at this time was at least 90%.

3) Second feed scan: the head was moved in the direction of arrow A in FIG. 3. The metallic ink D was discharged onto the recording medium from the metallic ink inkjet head Me at a fired droplet density of 300 dpi×1,200 dpi (the voltage and the number of pulses were adjusted so that the amount discharged from one nozzle was 42 pL). The recording medium was irradiated with UV using UV irradiation lamp UV2. The opened width of the slit was set narrow so that the percentage cure at this time was 80% to 85%.

4) Second return scan: the head was moved in the direction of arrow B in FIG. 3. The transparent ink F was discharged onto the recording medium from the transparent ink inkjet head T1 at a fired droplet density of 300 dpi×1,200 dpi (the voltage and the number of pulses were adjusted so that the amount discharged from one nozzle was 42 pL). The position and the angle of nozzles in the sub scanning direction and the discharge time were adjusted so that the centers of dots from the inkjet head T1 and the centers of dots from the inkjet head Me coincided with each other. Immediately after that, the recording medium was irradiated with UV using UV irradiation lamp UV2. The opened width of the slit was set wide so that the percentage cure at this time was at least 90%.

5) Feeding of recording medium: the recording medium was fed by only 43.6 mm, which was 10 mm less than the head width (53.6 mm).

6) Procedures 1) to 5) above were repeated to produce a printed material having an area of about 30 cm×about 30 cm.

7) After printing, metallic appearance, uniformity, and abrasion properties were evaluated using the evaluation criteria above.

Example 3'

The shuttle scanning type inkjet recording printer 1 was charged with metallic ink D and transparent ink F, and printing was carried out by the procedure below. As the recording medium, PET (Viewful, Kimoto) was used.

1) First feed scan: the head was moved in the direction of arrow A in FIG. 3. First, the metallic ink D was discharged onto the recording medium from the metallic ink inkjet head Me at a fired droplet density of 300 dpi×1,200 dpi (the voltage and the number of pulses were adjusted so that the amount discharged from one nozzle was 42 pL). The recording medium was irradiated with UV using UV irradiation lamp UV2. The opened width of the slit was set narrower so that the percentage cure at this time was 50% to 60%.

2) First return scan: the head was moved in the direction of arrow B in FIG. 3. The transparent ink F was discharged onto the recording medium from the transparent ink inkjet head T1 at a fired droplet density of 300 dpi×1,200 dpi (the voltage and the number of pulses were adjusted so that the amount discharged from one nozzle was 42 pL). The position and the angle of nozzles in the sub scanning direction and the discharge time were adjusted so that the centers of dots from the inkjet head T1 and the centers of dots from the inkjet head Me coincided with each other. Immediately after that, the recording medium was irradiated with UV using UV irradiation lamp UV2. The opened width of the slit was set wide so that the percentage cure at this time was at least 90%.

3) Second feed scan: the head was moved in the direction of arrow A in FIG. 3. The metallic ink D was discharged onto the recording medium from the metallic ink inkjet head Me at a fired droplet density of 300 dpi×1,200 dpi (the voltage and the number of pulses were adjusted so that the amount discharged from one nozzle was 42 pL). The recording medium was irradiated with UV using UV irradiation lamp UV2. The opened width of the slit was set narrower so that the percentage cure at this time was 50% to 60%.

4) Second return scan: the head was moved in the direction of arrow B in FIG. 3. The transparent ink F was discharged onto the recording medium from the transparent ink inkjet head T1 at a fired droplet density of 300 dpi×1,200 dpi (the voltage and the number of pulses were adjusted so that the amount discharged from one nozzle was 42 pL). The position and the angle of nozzles in the sub scanning direction and the discharge time were adjusted so that the centers of dots from the inkjet head T1 and the centers of dots from the inkjet head Me coincided with each other. Immediately after that, the recording medium was irradiated with UV using UV irradiation lamp UV2. The opened width of the slit was set wide so that the percentage cure at this time was at least 90%.

5) Feeding of recording medium: the recording medium was fed by only 43.6 mm, which was 10 mm less than the head width (53.6 mm).

6) Procedures 1) to 5) above were repeated to produce a printed material having an area of about 30 cm×about 30 cm.

7) After printing, metallic appearance, uniformity, and abrasion properties were evaluated using the evaluation criteria above.

Example 4'

The single pass type printer shown in FIG. 4 was charged with metallic ink D and transparent ink F, and printing was carried out by the procedure below. The transparent ink F was charged into the black ink head 40. As the recording medium, PET (Viewful, Kimoto) was used.

Cyan KO215, magenta KO867, and yellow KI052 of the UVJet series manufactured by FUJIFILM Specialty Ink Systems were charged into 35 for cyan, 37 for magenta, and 39 for yellow.

1) The recording medium was transported by rotation of the feeder 42 and the rewinder 43 in the direction of the arrows in FIG. 4.

2) The metallic ink D was discharged onto the recording medium from the metallic ink inkjet head unit 33 at a fired droplet density of 600 dpi×1,200 dpi (the voltage and the number of pulses were adjusted so that the amount discharged from one nozzle was 21 pL).

3) The transparent ink F was discharged onto the recording medium at a fired droplet density of 600 dpi×1,200 dpi from the black ink inkjet head unit 40 charged with the transparent ink F (the voltage and the number of pulses were adjusted so that the amount discharged from one nozzle was 21 pL). The position and the angle in the direction in which the nozzles were arranged and the timing of firing droplets were adjusted so that the centers of dots of the metallic ink and the centers of dots of the transparent ink coincided with each other.

4) The metallic ink/transparent ink layers were cured by irradiation with the metal halide lamp 41.

5) A printed material having an area of about 10 cm×about 30 cm was prepared by the procedure above.

6) After printing, metallic appearance, uniformity, and abrasion properties were evaluated using the evaluation criteria above.

Between step 3) and step 4), the cyan, magenta, and yellow inks were discharged onto the recording medium from the head units 35 for cyan, 37 for magenta, and 39 for yellow at a fired droplet density of 600 dpi×1,200 dpi so that there was partial overlap with the region onto which the metallic ink had been discharged.

Comparative Example 3'

Printing was carried out by the procedure of Example 4' without application of the transparent ink.

TABLE 7

| | PET | | | Coated paper | | | |
|---|---|---|---|---|---|---|---|
| | Metallic appearance | Uniformity | Abrasion properties | Metallic appearance | Uniformity | Abrasion properties | Notes |
| Comp. Ex. 1' | Poor | Lacks metallic appearance | Good | Excellent | Uniform | Good | Metallic ink only |
| Comp. Ex. 2' | Poor | Lacks metallic appearance | Good | | | | Metallic ink percentage cure greater than 85% |
| Ex. 2' | Fair | Uniform | Good | | | | Metallic ink percentage cure 80% to 85% |
| Ex. 3' | Excellent | Uniform | Good | | | | Metallic ink percentage cure 50% to 60% |
| Ex. 4' | Excellent | Uniform | Good | | | | Single pass method |
| Comp. Ex. 3' | Poor | Lacks metallic appearance | Good | | | | Single pass method (no transparent ink) |

The invention claimed is:

1. An inkjet recording method comprising in sequence
a transparent ink application step of applying a transparent ink onto a recording medium,
an image formation step of carrying out image formation by discharging an effect pigment ink onto the recording medium, and
a curing step of curing the transparent ink and the effect pigment ink above the recording medium,
the method comprising or not comprising, between the transparent ink application step and the image formation step, a step of curing the transparent ink, and when it does the transparent ink being cured at a percentage cure of no greater than 85%,
the effect pigment ink comprising an effect pigment, a polymerization initiator, and a polymerizable compound, and
the transparent ink comprising a polymerization initiator and a polymerizable compound but comprising substantially no pigment,
wherein the effect pigment comprises plate-shaped particles, the shape of the effect pigment satisfying relationship (1) and relationship (2) below $$0.5 \text{ μm} \leq R_{50} \leq 5 \text{ μm} \tag{1}$$

$$R_{50}/d > 5 \tag{2}$$

wherein in relationship (1) and relationship (2), $R_{50}$ is the 50% average particle size as an equivalent circle diameter obtained from the area of the plane of the particles, and d is the plate thickness, and wherein relationship (3) below is satisfied $$-10 \text{ mN/m} \leq \gamma k - \gamma s \leq 5 \text{ mN/m} \quad (3)$$

where the surface tension of the effect pigment ink is γk and the surface tension of the transparent ink is γs.

2. The inkjet recording method according to claim 1, wherein the method comprises or does not comprise, between the transparent ink application step and the image formation step, a step of curing the transparent ink, and when it does the transparent ink being cured at a percentage cure of no greater than 60%.

3. The inkjet recording method according to claim 1, wherein in the image formation step the effect pigment ink is discharged so as to overlap the transparent ink that has been applied onto the recording medium.

4. The inkjet recording method according to claim 1, wherein the effect pigment comprises aluminum or an aluminum alloy as a material.

5. The inkjet recording method according claim 1, wherein the transparent ink comprises a polymerizable compound selected from group 2 below in an amount of at least 60 wt % of the entire polymerizable compounds
(Group 1-2)
N-vinylcaprolactam, N-vinylformamide, N-vinylacetamide, N-methyl-N-vinylacetamide, tetrahydrofurfuryl acrylate, cyclic trimethylolpropane formal acrylate, 2-phenoxyethyl acrylate, triethylene glycol diacrylate, tetraethylene glycol diacrylate, trimethylolpropane triacrylate, and ethylene oxide-modified trimethylolpropane triacrylate.

6. The inkjet recording method according to claim 1, wherein the transparent ink comprises a polymerizable compound selected from group 3 below in an amount of at least 60 wt % of the entire polymerizable compounds
(Group 1-3)
N-vinylcaprolactam and 2-phenoxyethyl acrylate.

7. The inkjet recording method according to claim 1, wherein the effect pigment ink further comprises a surfactant.

8. The inkjet recording method according to claim 7, wherein the surfactant is a nonionic surfactant.

9. The inkjet recording method according to claim 7, wherein the surfactant is a polymer comprising a poly(meth) acrylate skeleton.

10. The inkjet recording method according to claim 1, wherein the transparent ink is provided as a layer beneath the effect pigment ink and has a function of maintaining a higher concentration state of the effect pigment than the initial state of the effect pigment ink due to diffusion of part of the polymerizable compound in the effect pigment ink into the transparent ink.

11. An inkjet recording method comprising in sequence
a transparent ink application step of applying a transparent ink onto a recording medium,
an image formation step of carrying out image formation by discharging an effect pigment ink onto the recording medium, and
a curing step of curing the transparent ink and the effect pigment ink above the recording medium,
the method comprising or not comprising, between the transparent ink application step and the image formation step, a step of curing the transparent ink, and when it does the transparent ink being cured at a percentage cure of no greater than 85%,
the effect pigment ink comprising an effect pigment, a polymerization initiator, and a polymerizable compound, and
the transparent ink comprising a polymerization initiator and a polymerizable compound but comprising substantially no pigment,
wherein the effect pigment comprises plate-shaped particles, the shape of the effect pigment satisfying relationship (1) and relationship (2) below $$0.5 \text{ μm} \leq R_{50} \leq 5 \text{ μm} \quad (1)$$

$$R_{50}/d > 5 \quad (2)$$

wherein in relationship (1) and relationship (2), $R_{50}$ is the 50% average particle size as an equivalent circle diameter obtained from the area of the plane of the particles, and d is the plate thickness, and
wherein relationship (4) below is satisfied $$30 \text{ mN/m} \leq \gamma k < \gamma s \leq 40 \text{ mN/m} \quad (4)$$

where the surface tension of the effect pigment ink is γk and the surface tension of the transparent ink is γs.

12. An inkjet recording method comprising in sequence
a transparent ink application step of applying a transparent ink onto a recording medium,
an image formation step of carrying out image formation by discharging an effect pigment ink onto the recording medium, and
a curing step of curing the transparent ink and the effect pigment ink above the recording medium,
the method comprising or not comprising, between the transparent ink application step and the image formation step, a step of curing the transparent ink, and when it does the transparent ink being cured at a percentage cure of no greater than 85%,
the effect pigment ink comprising an effect pigment, a polymerization initiator, and a polymerizable compound, and
the transparent ink comprising a polymerization initiator and a polymerizable compound but comprising substantially no pigment,
wherein the effect pigment comprises plate-shaped particles, the shape of the effect pigment satisfying relationship (1) and relationship (2) below $$0.5 \text{ μm} \leq R_{50} \leq 5 \text{ μm} \quad (1)$$

$$R_{50}/d > 5 \quad (2)$$

wherein in relationship (1) and relationship (2), $R_{50}$ is the 50% average particle size as an equivalent circle diameter obtained from the area of the plane of the particles, and d is the plate thickness, and
wherein the effect pigment ink comprises a polymerizable compound selected from group 1 below in an amount of at least 40 wt % of the entire polymerizable compounds
(Group 1-1)
octyl acrylate, decyl acrylate, lauryl acrylate, stearyl acrylate, isobornyl acrylate, isophoryl acrylate, 2-(2-ethoxyethoxy)ethyl acrylate, 1,6-hexanediol diacrylate, 3-methyl-1,5-pentanediol diacrylate, dipropylene glycol diacrylate, and propylene oxide-modified trimethylolpropane triacrylate.

\* \* \* \* \*